United States Patent
Schmier, II et al.

(10) Patent No.: US 10,677,746 B2
(45) Date of Patent: Jun. 9, 2020

(54) MEASUREMENT APPARATUS, SYSTEM, AND METHOD FOR OBTAINING CONDUCTIVITY MEASUREMENTS OF A SURFACE OF A STRUCTURE

(71) Applicant: The Boeing Company, Chicago, IL (US)

(72) Inventors: Mark A. Schmier, II, Mesa, AZ (US); Gary E. Jones, Mesa, AZ (US); Ricky A. Kuehn, Mesa, AZ (US); Heather Burns, Bothell, WA (US); Carlos Portugal, Oceanside, CA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 15/817,207

(22) Filed: Nov. 18, 2017

(65) Prior Publication Data
US 2019/0154614 A1 May 23, 2019

(51) Int. Cl.
*G01N 27/20* (2006.01)
(52) U.S. Cl.
CPC .................. *G01N 27/20* (2013.01)
(58) Field of Classification Search
CPC ................................................. G01N 27/20
USPC ............................................................... 324/693
See application file for complete search history.

(56) References Cited

U.S. PATENT DOCUMENTS

| | | | | |
|---|---|---|---|---|
| 4,721,903 A | * | 1/1988 | Harsch | G01R 1/06788 30/367 |
| 8,417,469 B1 | * | 4/2013 | El Masri | G01M 99/007 702/151 |
| 9,435,766 B2 | * | 9/2016 | Plotnikov | G01N 27/902 |
| 2009/0056427 A1 | * | 3/2009 | Hansma | A61B 5/0053 73/82 |

* cited by examiner

*Primary Examiner* — Reena Aurora

(57) ABSTRACT

There is provided a measurement apparatus for obtaining conductivity measurements of a surface of a structure. The apparatus has a housing, and a pair of support legs depending from the housing. Each support leg has a first end, wherein the first ends define a support leg plane. The apparatus has a pair of conductive measurement probes slidably disposed between the support legs, and at least one force applying member coupled to the housing. The at least one force applying member applies a biasing force to cause the pair of conductive measurement probes to extend a predetermined distance beyond the support leg plane. A downward applied force applied to the housing, when the conductive measurement probes are in contact with the surface, causes a displacement of the conductive measurement probes, until the first ends of the support legs contact the surface. Conductivity measurements between the conductive measurement probes are consistently obtained.

20 Claims, 17 Drawing Sheets

MEASUREMENT APPARATUS, SYSTEM, AND METHOD FOR OBTAINING CONDUCTIVITY MEASUREMENTS OF A SURFACE OF A STRUCTURE

BACKGROUND

1) Field of the Disclosure

The disclosure relates generally to an apparatus, system, and method for measuring conductivity or surface resistivity of structures, and more particularly, to a direct current (DC) apparatus, system, and method having conductive measurement probes for consistently measuring conductivity or surface resistivity of structures, such as an aircraft part or aircraft assembly.

2) Description of Related Art

Non-destructive testing or inspection, such as direct current (DC) testing or inspection, may be used in the aerospace industry to test or inspect the conductivity or surface resistivity, of structures, such as aircraft parts and aircraft assemblies, as a quality and process control measure, or to verify the performance of the structures, and may be performed during manufacturing or after the finished structure has been put into service.

Known devices and methods exist for direct current (DC) testing and inspection of conductivity or surface resistivity of aircraft parts and aircraft assemblies. Such known devices and methods typically involve use of a direct current (DC) conductivity probe device connected to an ohm meter and use of one or more separate indirect lighting devices to provide light, such as separate hand-held lighting devices, overhead lighting, or floor or table mounted portable lighting systems, in order to visibly see the ohm meter and to visibly see the surface of the structure being tested or inspected with the known DC conductivity probe device.

However, the separate indirect lighting device, such as the separate hand-held lighting device, may be held in one hand of an operator, and may require that an operator use his or her other hand to see where the DC conductivity probe device is being placed or aligned on the surface of the structure being tested or inspected, thus diverting the operator's focus off the testing and inspection being performed. Moreover, an operator may have difficulty positioning the probe contact points of the known DC conductivity probe device to the surface of the structure being tested or inspected, due to obstructed visibility and low visibility between the probe contact points and due to shadow distortions. For example, the separate hand-held lighting device may have to be positioned and angled to visually see under and between the probe contact points of the known DC conductivity probe device, as the known DC conductivity probe device is moved along the surface of the structure being tested or inspected. Further, the separate indirect lighting devices, including fixed and portable light sources, may not maintain adequate lighting under and around the probe contact points of the known DC conductivity probe device positioned on the surface of the structure being tested or inspected. In addition, the ohm meter used with known DC conductivity probe devices is also typically hand-held, and in low light conditions, it may be difficult to see the ohm meter. Thus, due to the use of such known DC conductivity probe devices with an ohm meter and one or more separate indirect lighting devices, multiple operators may be needed at one time to adequately perform the testing and inspection. Requiring multiple operators may result in increased labor costs.

In addition, conductivity measurements and surface resistance measurements of a surface of a structure being measured or tested by operators using known DC conductivity probe devices may vary from operator to operator, depending on how the DC conductivity probe device is angled to the surface of the structure being tested or inspected, and depending on how hard the operator presses down or applies pressure to the surface of the structure being tested or inspected. Variability in applied surface pressure and variability in surface area contact, from operator to operator, may result in inconsistent and nonuniform conductivity measurements and surface resistance measurements of the surface of the structure being tested or inspected, and may result in decrease measurement accuracy. Moreover, surface measurements may not be independent of the pressure applied by operators using such known DC conductivity probe devices, and thus, such surface measurements may vary from operator to operator.

Accordingly, there is a need in the art for an improved apparatus, system, and method for obtaining conductivity measurements or surface resistance measurements of a surface of a structure, such as an aircraft structure, that provide consistent and uniform measurements and improved measurement accuracy, that are efficient, simple to use, low cost, and reliable, and that provide advantages over known apparatuses, systems, and methods.

SUMMARY

Example implementations of this disclosure provide for an improved apparatus, system, and method for obtaining conductivity measurements of a surface of a structure, such as an aircraft structure. As discussed in the below detailed description, versions of the improved apparatus, system, and method may provide significant advantages over known apparatuses, systems, and methods.

In one version there is provided a measurement apparatus for obtaining conductivity measurements of a surface of a structure. The measurement apparatus comprises a housing. The measurement apparatus further comprises a pair of support legs depending from the housing. Each support leg has a first end, wherein the first ends define a support leg plane.

The measurement apparatus further comprises a pair of conductive measurement probes slidably disposed between the support legs. The measurement apparatus further comprises at least one force applying member coupled to the housing. The at least one force applying member applies a biasing force to cause the pair of conductive measurement probes to extend a predetermined distance beyond the support leg plane.

A downward applied force applied to the housing, when the conductive measurement probes are in contact with the surface, causes a displacement of the conductive measurement probes, until the first ends of the support legs contact the surface, such that compression of the at least one force applying member by the displacement provides a predetermined probe contact force against the surface, that is independent of the downward applied force. Conductivity measurements between the conductive measurement probes are consistently obtained to thereby improve conductivity measurement accuracy.

In another version there is provided, a measurement system for obtaining conductivity measurements of a surface of a structure. The measurement system comprises a measurement apparatus.

The measurement apparatus comprises a housing and a pair of support legs depending from the housing. Each support leg has a first end, wherein the first ends define a support leg plane. Each support leg further has a slide rail formed along an inner side of each support leg.

The measurement apparatus further comprises a pair of conductive measurement probes slidably disposed between the support legs. Each conductive measurement probe has a slide groove formed in an outer side of each conductive measurement probe. Each slide rail is configured to slide along each corresponding slide groove.

The measurement apparatus further comprises at least one spring coupled to the housing. The at least one spring applies a biasing force to cause the pair of conductive measurement probes to extend a predetermined distance beyond the support leg plane.

The measurement apparatus further comprises a computer system coupled to the measurement apparatus. The computer system comprises at least a computer, a processor device for executing one or more computing functions of the computer, and a computer software program configured to perform data analysis of data comprising the conductivity measurements obtained with the measurement apparatus.

A downward applied force applied to the housing, when the conductive measurement probes are in contact with the surface, causes a displacement of the conductive measurement probes, until the first ends of the support legs contact the surface, such that compression of the at least one spring by the displacement provides a predetermined probe contact force against the surface, that is independent of the downward applied force. The conductivity measurements between the conductive measurement probes are consistently obtained to thereby improve conductivity measurement accuracy.

In another version there is provided a measurement method for obtaining conductivity measurements of a surface of a structure. The measurement method comprises the step of assembling a measurement apparatus.

The measurement apparatus comprises a housing. The measurement apparatus further comprises a pair of support legs depending from the housing. Each support leg has a first end, wherein the first ends define a support leg plane.

The measurement apparatus further comprises a pair of conductive measurement probes slidably disposed between the support legs. The measurement apparatus further comprises at least one force applying member coupled to the housing. The at least one force applying member applies a biasing force to cause the pair of conductive measurement probes to extend a predetermined distance beyond the support leg plane.

The measurement method further comprises the step of positioning the measurement apparatus on the surface of the structure to be measured for conductivity, so that a first contact end of each of the conductive measurement probes is in contact with the surface. The measurement method further comprises the step of applying a downward applied force to a top end of the housing, causing a displacement of the conductive measurement probes, until the first ends of the support legs contact the surface, resulting in a consistent application of the downward applied force on the surface of the structure.

The measurement method further comprises the step of providing, via compression of the at least one force applying member by the displacement, a predetermined probe contact force against the surface, the predetermined probe contact force being independent of the downward applied force. The measurement method further comprises the step of moving the measurement apparatus across the surface, and consistently measuring and obtaining conductivity measurements between the conductive measurement probes.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein.

Each figure shown in this disclosure shows a variation of an aspect of the versions or embodiments presented, and only differences will be discussed in detail.

DETAILED DESCRIPTION

Disclosed versions or embodiments will now be described more fully hereinafter with reference to the accompanying drawings, in which some, but not all of the disclosed versions or embodiments are shown. Indeed, several different versions may be provided and should not be construed as limited to the versions set forth herein. Rather, these versions are provided so that this disclosure will be thorough and fully convey the scope of the disclosure to those skilled in the art.

Figure 1A:
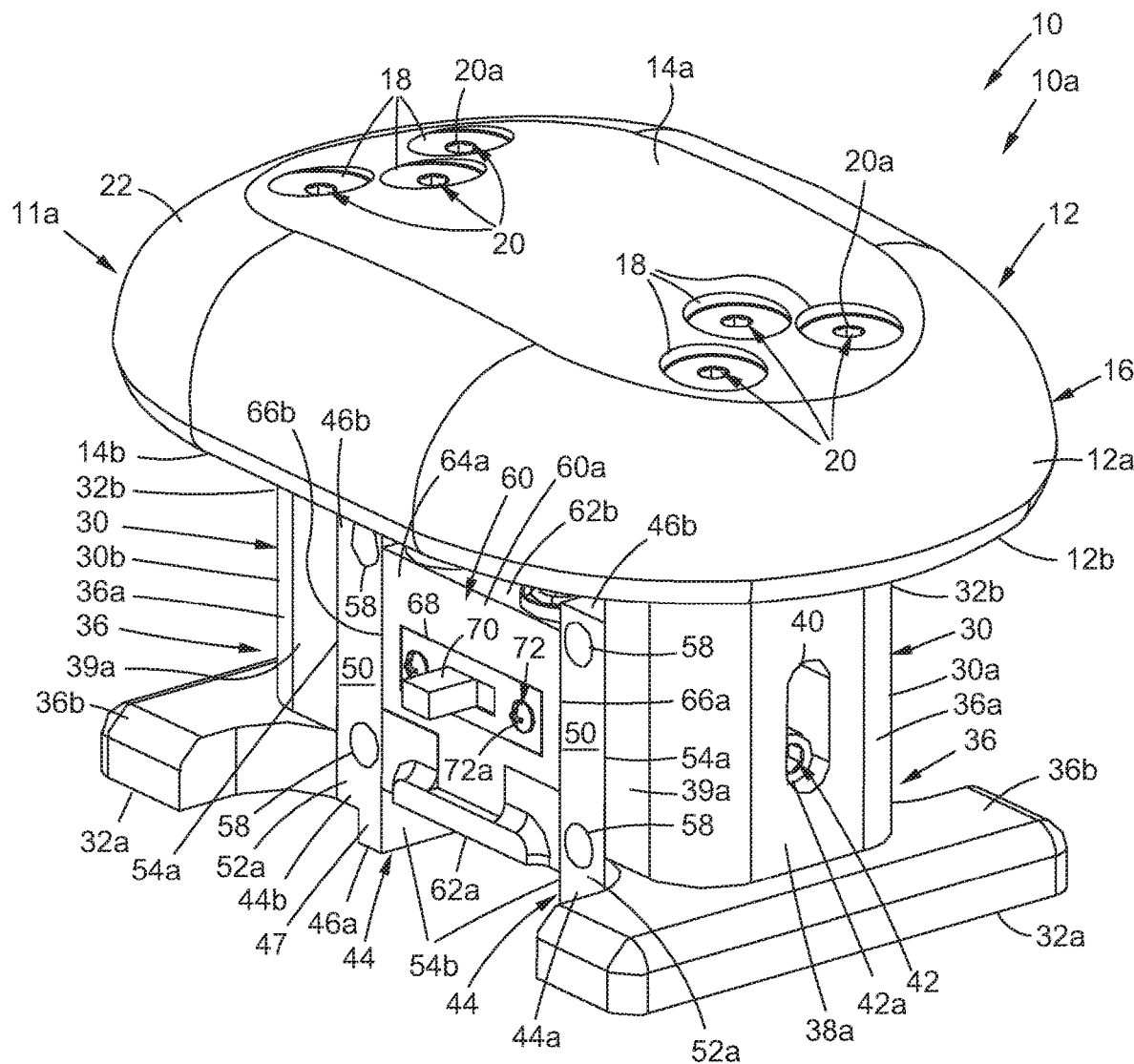
FIG. 1A is an illustration of a front perspective view of an exemplary version of a measurement apparatus of the disclosure, in the form of a set increment measurement apparatus.
Figure 1B:
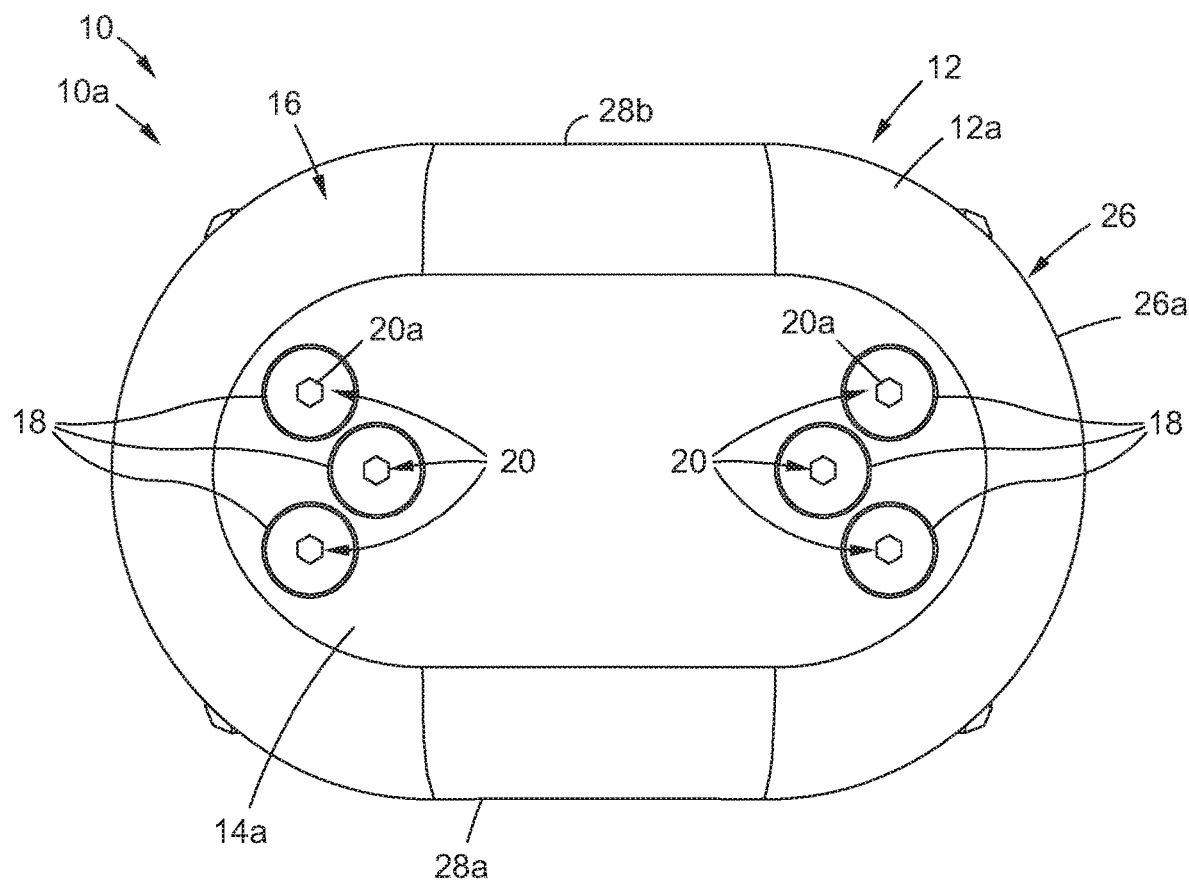
FIG. 1B is an illustration of a top view of the measurement apparatus of FIG. 1A.
Figure 1C:
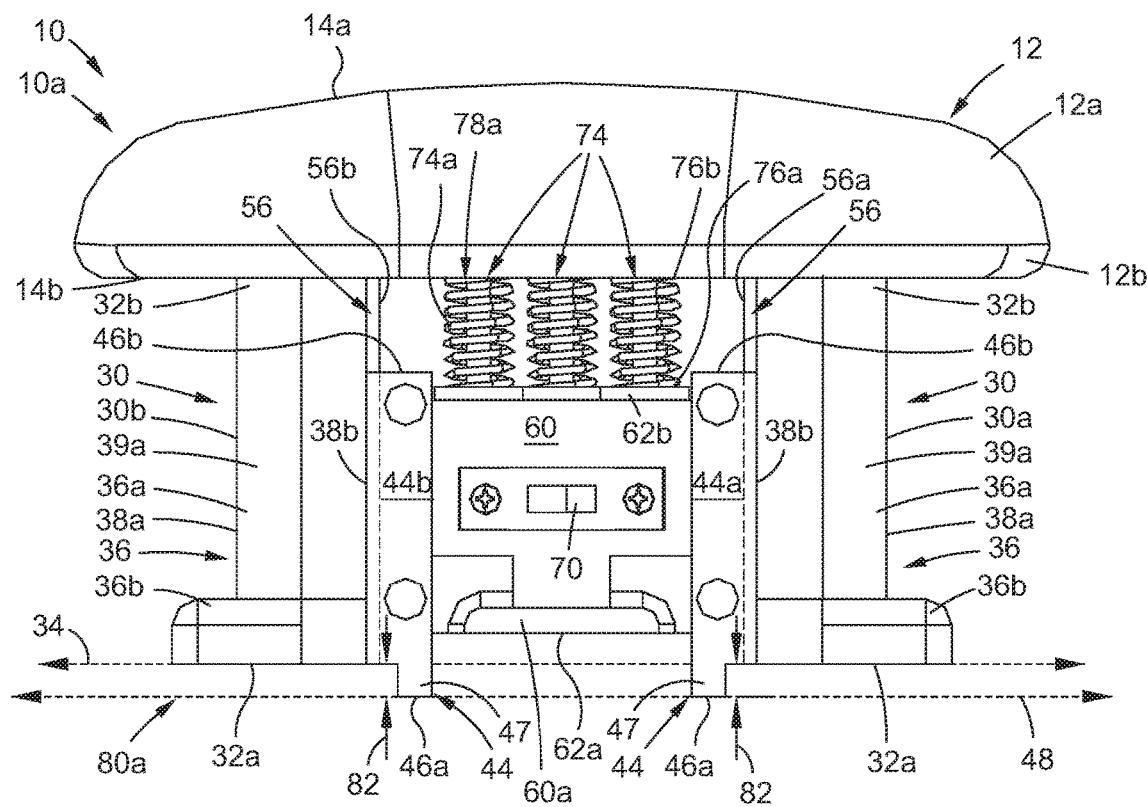
FIG. 1C is an illustration of a front view of the measurement apparatus of FIG. 1A, in a non-measurement position.
Figure 1D:
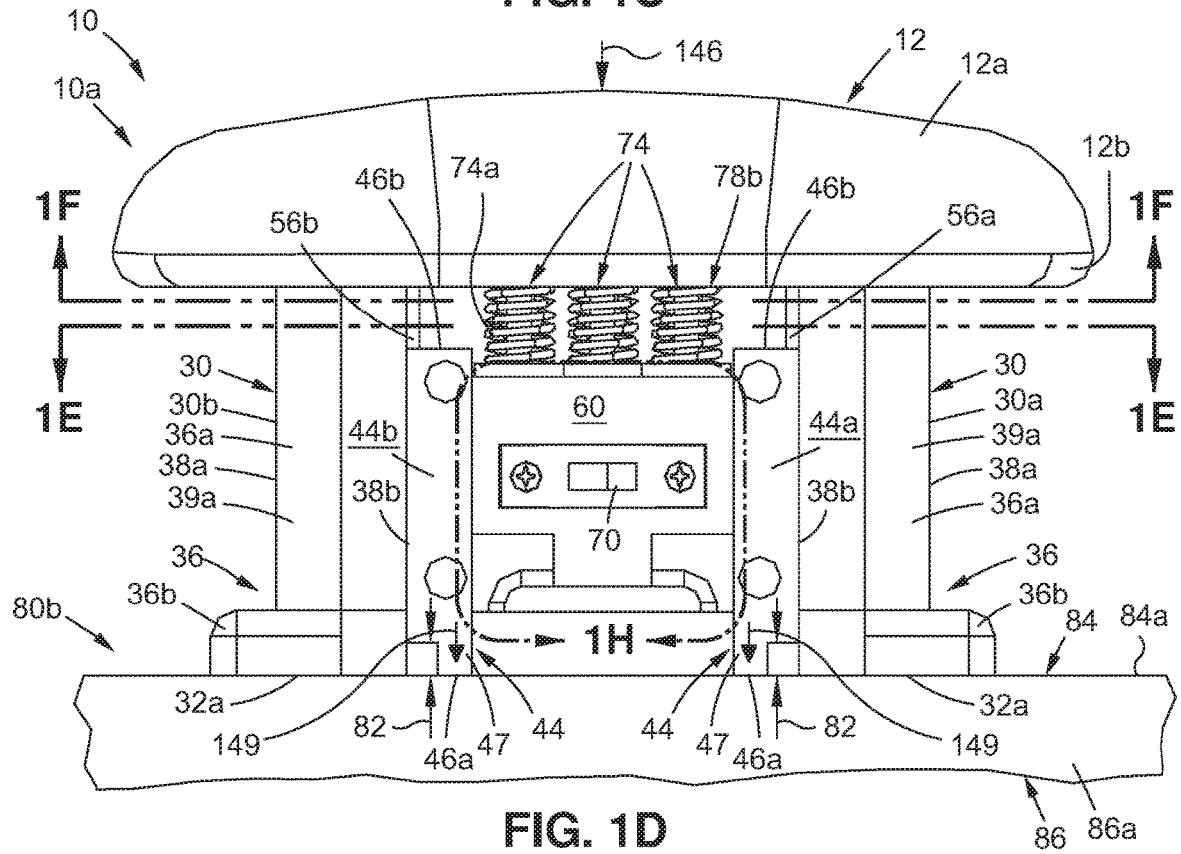
FIG. 1D is an illustration of a front view of the measurement apparatus of FIG. 1C, in a measurement position.

Now referring to FIGS. 1A-1K, in one version there is provided a measurement apparatus 10, such as in the form of measurement apparatus 10a, for obtaining conductivity measurements 140 (see FIG. 4) of a surface 84 (see FIG. 1D) of a structure 86 (see FIG. 1D). FIG. 1A is an illustration of a front perspective view of an exemplary version of the measurement apparatus 10, such as in the form of measurement apparatus 10a, of the disclosure. As shown in FIG. 1A, in this version, the measurement apparatus 10 is a set increment measurement apparatus 11a.

The measurement apparatus 10 (see FIG. 1A) is used to verify the performance of, or test or measure, a conductivity 138 (see FIG. 4) or a surface resistivity 136 (see FIG. 4) of a structure 86 (see FIG. 4), such as an aircraft part 86a (see FIG. 4), to determine a value. The aircraft part 86a (see FIG. 4) may be a finished part or may be in process, for example, fuselage 202 (see FIG. 6) parts or tail 212 (see FIG. 6) parts.

As used herein, "conductivity" means a measure of the ability of a given material to conduct electric current through the material, and is equal to the reciprocal of surface resistivity of the material. As used herein, "surface resistivity" means the electrical resistance that exists between two parallel electrodes or probes in contact through a surface, where the electrodes or probes are separated by a distance equal to a contact length of the electrodes or probes. The surface resistivity may be measured in ohms or ohms per square.

As shown in FIG. 1A, the measurement apparatus 10 such as in the form of measurement apparatus 10a, comprises a housing 12 having a first portion 12a and a second portion 12b. The housing 12 (see FIG. 1A) has a top end 14a (see FIG. 1A), a bottom end (see FIG. 1A), and a body 16 (see FIG. 1A) formed in between the top end 14a and the bottom end 14b. The housing 12 (see FIG. 1A) is preferably made of a dielectric or electrically insulated material, such as acrylic or another suitable plastic material, and may comprise a machined material or an injection molded material.

The housing 12 (see FIG. 1A) preferably has one or more through openings 18 (see FIG. 1A) formed through the housing 12. Each through opening 18 (see FIG. 1A) preferably has an attachment element 20, such as in the form of a bolt 20a, inserted through the through opening 18. Alternatively, the attachment element 20 may comprise a screw, a rivet, a fastener, or another suitable attachment element 20. FIG. 1A shows the top end 14a of the first portion 12a of housing 12 having six through openings 18 with six corresponding attachment elements 20, such as in the form of bolts 20a, where each bolt 20a is inserted into each respective through opening 18. Although FIG. 1A shows six through openings 18 and six corresponding attachment elements 20, the housing 12 may have one, two, three, four, five, or more than six through openings 18 and corresponding attachment elements 20. FIG. 1A shows an exterior 22 of the housing 12. FIG. 1F, discussed below, shows an interior 24 of the housing 12.

As further shown in FIG. 1A, the measurement apparatus 10, such as in the form of measurement apparatus 10a, comprises a pair of support legs 30 depending from the housing 12. The support legs 30 (see FIG. 1A) comprise a first support leg 30a (see FIG. 1A) and a second support leg 30b (see FIG. 1A).

Figure 3A:
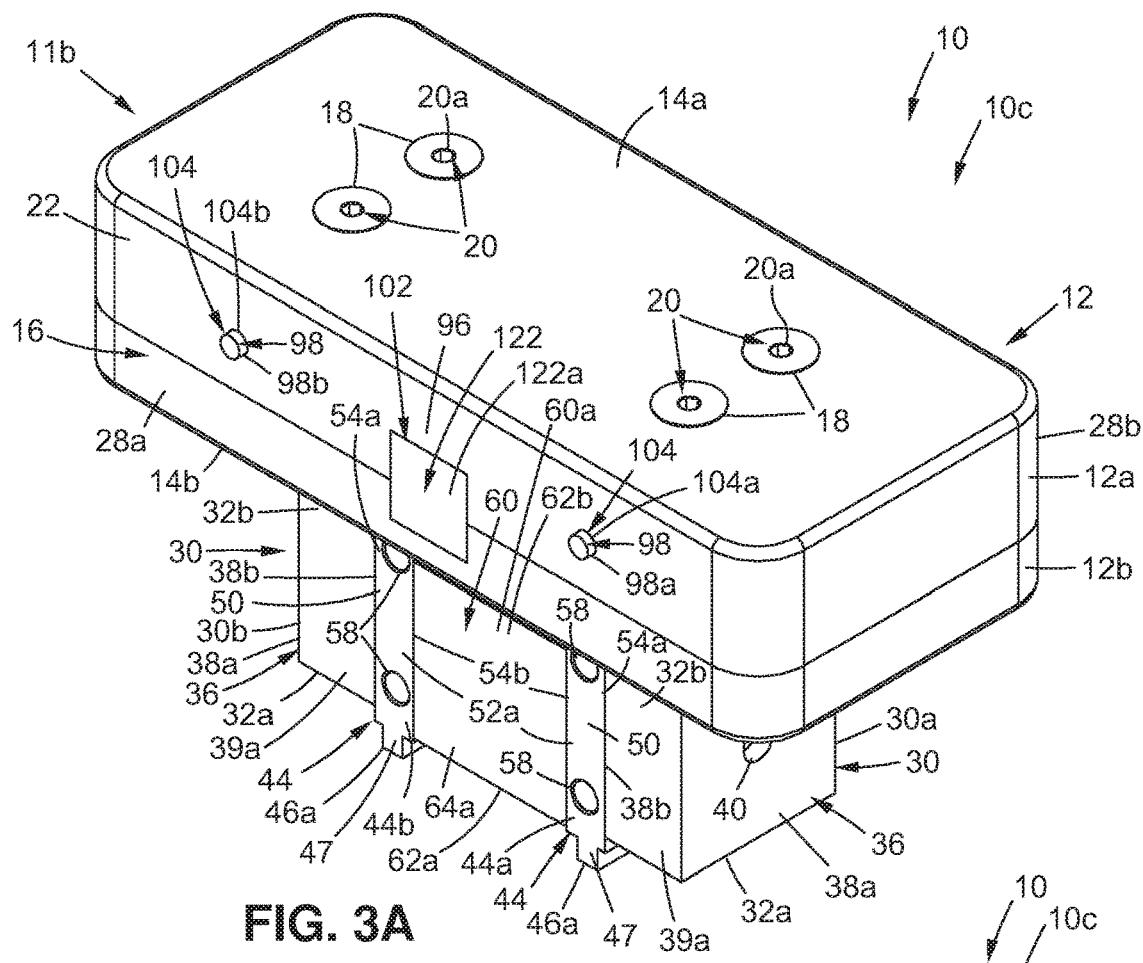
FIG. 3A is an illustration of a front perspective view of yet another exemplary version of a measurement apparatus of the disclosure, in the form of a variable increment measurement apparatus.

Each support leg 30 (see FIG. 1A) has the first end 32a (see FIG. 1A) and a second end 32b (see FIG. 1A). The first ends 32a (see FIGS. 1A, 1C) define a support leg plane 34 (see FIG. 1C). As further shown in FIG. 1A, each of the support legs 30 has a support leg structure 36. In one version, as shown in FIG. 1A, the support leg structure 36 comprises a support leg post portion 36a coupled to a support leg base portion 36b. In another version, as shown in FIG. 3A, the support leg structure 36 comprises a support leg rectangular block portion 36c. The support leg structure 36 (see FIG. 1A) may also comprise another suitable structure of one, two, or more portions.

Figure 1E:
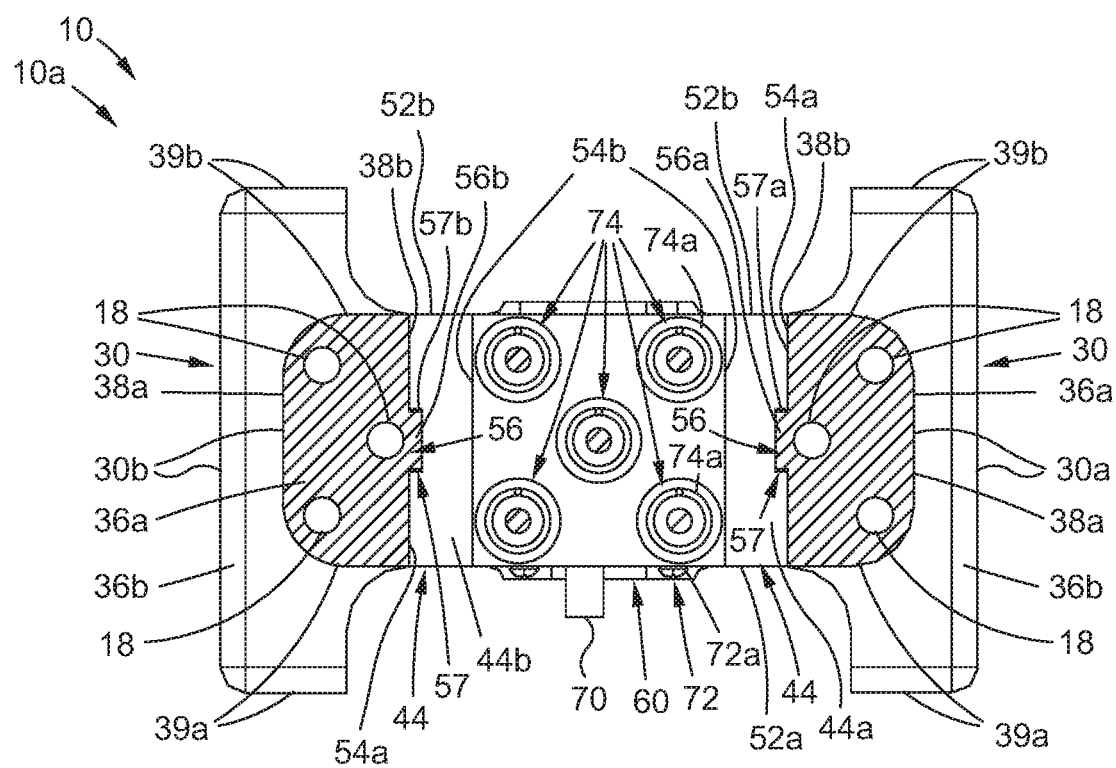
FIG. 1E is an illustration of a cross-sectional view taken along lines 1E-1E of FIG. 1D.
Figure 1F:
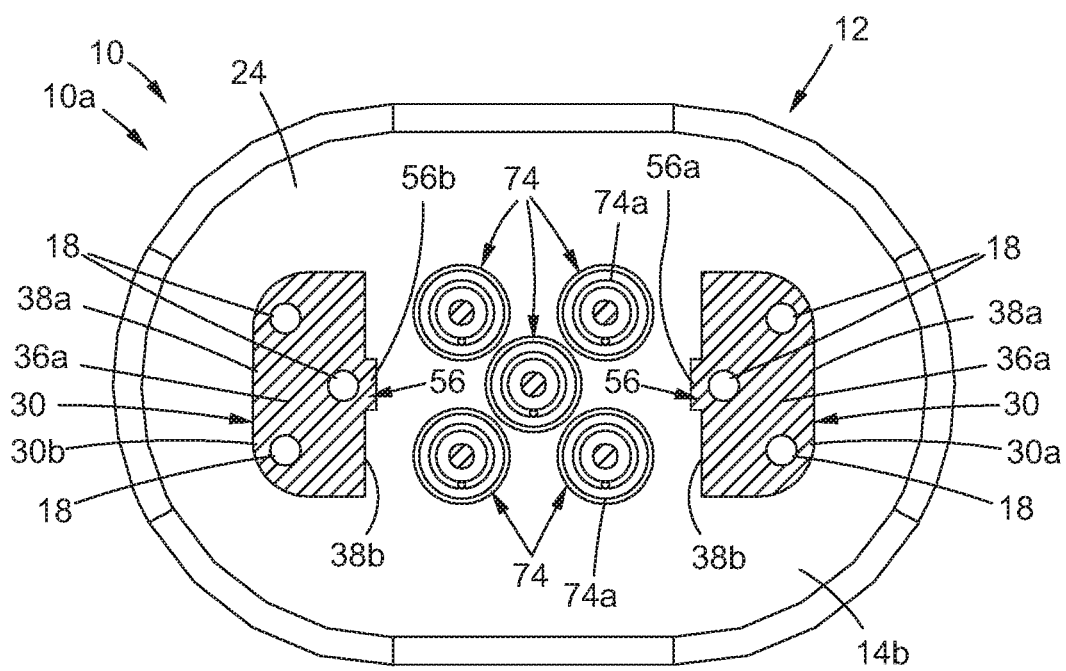
FIG. 1F is an illustration of a cross-sectional view taken along lines 1F-1F of FIG. 1D.
Figure 1G:
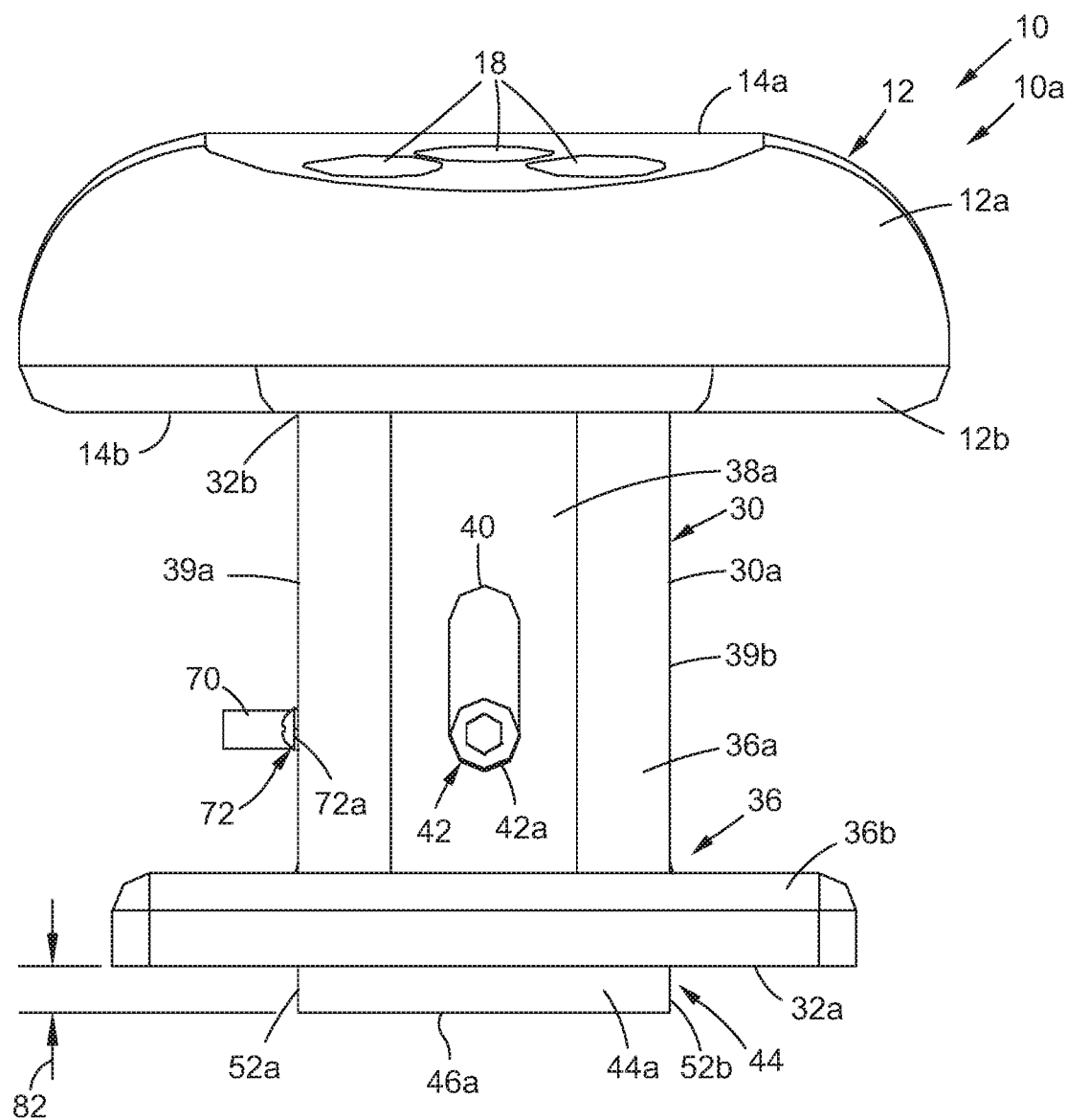
FIG. 1G is an illustration of a right side view of the measurement apparatus of FIG. 1A.

Each support leg 30 (see FIG. 1A) further has an outer side 38a (see FIG. 1A), an inner side 38b (see FIG. 1C), a front side 39a (see FIG. 1A), and a back side 39b (see FIG. 1G). Each support leg 30 (see FIG. 1A) further has a support leg opening 40 formed in the outer side 38a (see FIG. 1A) of the support leg 30. As shown in FIG. 1A, in one version, a stop element 42 or travel stop, such as in the form of a machine pin 42a or other suitable stop element 42, is inserted through and coupled within the support leg opening 40 (see FIG. 1A). The stop element 42, such as in the form of the machine pin 42a, is configured to limit a displacement 144 (see FIG. 4) of a slide rail 56 (see FIGS. 1C, 1E) of each support leg 30 sliding along a corresponding slide groove 57 (see FIG. 1E) formed in each of a pair of conductive measurement probes 44 (see FIGS. 1A, 1E).

The slide rail 56 (see FIG. 1C) of each support leg 30 (see FIGS. 1A, 1C) is preferably formed longitudinally along the inner side 38b (see FIG. 1C) of each support leg 30 (see FIG. 1C). FIG. 1C shows the first support leg 30a having a first slide rail 56a and shows the second support leg 30b having a second slide rail 56b.

As shown in FIG. 1A, the measurement apparatus 10, such as in the form of measurement apparatus 10a, further comprises the pair of conductive measurement probes 44, such as in the form of a first conductive measurement probe 44a and a second conductive measurement probe 44b, both slidably disposed between the inner sides 38b (see FIG. 1C) of the support legs 30. The conductive measurement probes 44 (see FIG. 1A) are preferably made of a metal material, such as copper, brass, gold-plated copper, gold-plated brass, gold, or any suitable highly conductive metal material. Preferably, the conductive measurement probes 44 (see FIG. 1A) are made of copper which has electrical conductivity efficiency.

Each of the conductive measurement probes 44 (see FIG. 1A) comprises a first contact end 46a (see FIG. 1A), a second end 46b (see FIG. 1A), an extending portion 47 (see FIG. 1A), a probe body 50 (see FIG. 1A), a front side 52a (see FIG. 1A), a back side 52b (see FIG. 1E), an outer side 54a, an inner side 54b, and one or more probe openings 58. The first contact ends 46a (see FIGS. 1A, 1C) of each conductive measurement probe 44 (see FIGS. 1A, 1C) define a probe plane 48 (see FIG. 1C).

Figure 4:
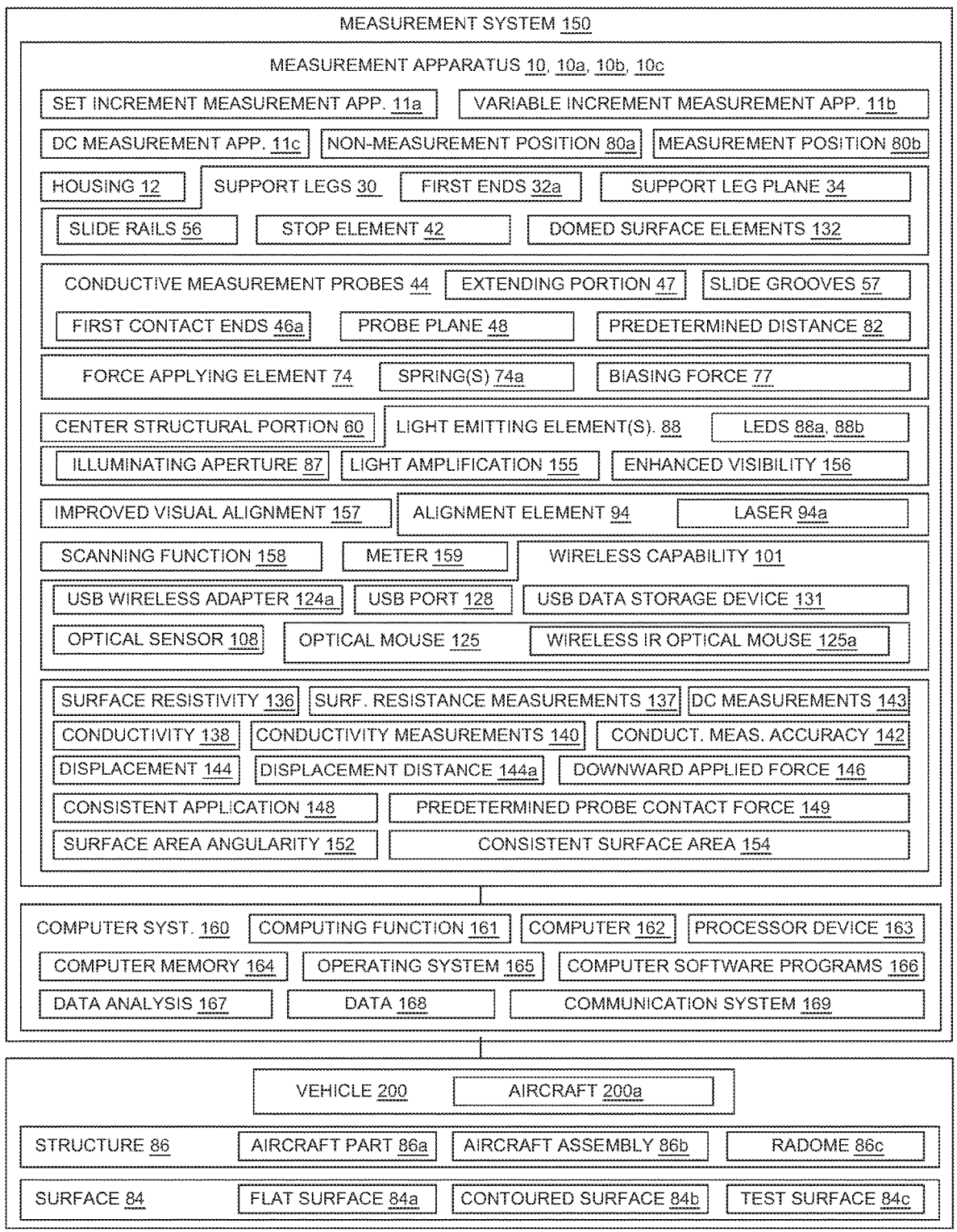
FIG. 4 is an illustration of a functional block diagram of exemplary versions of the measurement system and the measurement apparatus of the disclosure.

A meter 159 (see FIG. 4), such as an ohm meter, is preferably connected, via one or more wires, to the conductive measurement probes 44 (see FIG. 1A) of the measurement apparatus 10 (see FIG. 4). The one or more wires of the meter 159 (see FIG. 4) may be inserted or plugged into one or more of the probe openings 58 (see FIG. 1A), in the conductive measurement probes 44 (see FIGS. 1A, 2A, 3A, 4). Thus, the measurement apparatus 10 (see FIG. 1A) is hardwired to the meter 159 (see FIG. 4), and the plug-in wires of the meter 159 (see FIG. 4) allow the meter 159 to be held or connected in a hands-free manner by the operator or user.

Each of the conductive measurement probes 44 (see FIGS. 1A, 1E) preferably further comprises the slide groove 57 (see FIG. 1E) formed in the outer side 54a (see FIGS. 1A, 1E) of each conductive measurement probe 44. Each slide rail 56 (see FIGS. 1C, 1E) of each support leg 30 (see FIGS. 1A, 1C, 1E) is configured to slide along each corresponding slide groove 57 (see FIG. 1E) formed in the outer side 54a (see FIGS. 1A, 1E)) of each conductive measurement probe 44 (see FIGS. 1A, 1C, 1E), such that the conductive measurement probes 44 are slidably disposed between the support legs 30.

As shown in FIG. 1A, the measurement apparatus 10, such as in the form of measurement apparatus 10a, may further comprise a center structural portion 60, such as in the form of a center block 60a, coupled between the inner sides 54b of the conductive measurement probes 44.

As further shown in FIG. 1A, the center structural portion 60, such as in the form of center block 60a, has a first end 62a, a second end 62b, a front side 64a, a back side 64b (see FIG. 1J), a first side 66a adjacent the inner side 54b of the first conductive measurement probe 44a, a second side 66b adjacent the inner side 54b of the second conductive measurement probe 44b, a switch plate 68 for a switch 70, where the switch plate 68 is attached to the front side 64a of the center structural portion 60 with one or more fastener elements 72, such as in the form of one or more screws 72a, or another suitable attachment.

Now referring to FIG. 1B, FIG. 1B is an illustration of a top view of the measurement apparatus 10, such as in the form of measurement apparatus 10a, of FIG. 1A. FIG. 1B shows the top end 14a of the first portion 12a of housing 12 having the six through openings 18 with six corresponding attachment elements 20, such as in the form of bolts 20a, where each bolt 20a is inserted into each respective through opening 18. FIG. 1B further shows a front end 28a of the housing 12, a back end 28b of the housing 12, and the body 16 of the housing 12. In this version, the housing 12 (see FIG. 1B) has a housing cross-section configuration 26 (see FIG. 1B), such as in the form of an oval cross-section configuration 26a (see FIG. 1B). In another version, as shown in FIG. 2G, the housing cross-section configuration 26 may be the form of a rectangular cross-section configuration 26b. Alternatively, the housing cross-section configuration 26 may comprise another shape or configuration.

Now referring to FIG. 1C, FIG. 1C is an illustration of a front view of the measurement apparatus 10, such as in the form of measurement apparatus 10a, of FIG. 1A, in a non-measurement position 80a. As shown in FIG. 1C, the measurement apparatus 10, such as in the form of measurement apparatus 10a, comprises the first portion 12a and the second portion 12b of the housing 12, and comprises the top end 14a and the bottom end 14b of the housing 12. As further shown in FIG. 1C, the measurement apparatus 10 such as in the form of measurement apparatus 10a, comprises the pair of support legs 30 depending from the housing 12. The support legs 30 (see FIG. 1C) comprise the first support leg 30a (see FIG. 1C) and the second support leg 30b (see FIG. 1C).

Each support leg 30 (see FIG. 1C) has the first end 32a (see FIG. 1C) and the second end 32b (see FIG. 1C), and the first ends 32a (see FIG. 1C) define the support leg plane 34 (see FIG. 1C). As further shown in FIG. 1C, each of the support legs 30 has the support leg structure 36 comprising the support leg post portion 36a and the support leg base portion 36b. Each support leg 30 (see FIG. 1C) further has the outer side 38a (see FIG. 1C), the inner side 38b (see FIG. 1C), the front side 39a (see FIG. 1C), and the back side 39b (see FIG. 1G). Each support leg 30 (see FIG. 1C) further has the slide rail 56 (see FIG. 1C) formed longitudinally along the inner side 38b (see FIG. 1C) of each support leg 30 (see FIG. 1C). FIG. 1C shows the first support leg 30a having a first slide rail 56a and shows the second support leg 30b having a second slide rail 56b.

As shown in FIG. 1C, the measurement apparatus 10 such as in the form of measurement apparatus 10a, further comprises the pair of conductive measurement probes 44, such as in the form of first conductive measurement probe 44a and second conductive measurement probe 44b, both slidably disposed between the inner sides 38b of the support legs 30. FIG. 1C shows each of the conductive measurement probes 44 having the first contact end 46a, the second end 46b, and the extending portion 47, where the first contact ends 46a define the probe plane 48.

FIG. 1C further shows the center structural portion 60, such as in the form of the center block 60a, coupled between the pair of conductive measurement probes 44, such as in the form of first conductive measurement probe 44a and second conductive measurement probe 44b. As shown in FIG. 1C, the center structural portion 60 has the first end 62a, the second end 62b, and the switch 70.

As shown in FIG. 1C, the measurement apparatus 10 such as in the form of measurement apparatus 10a, further comprises at least one force applying member 74, such as in the form of a spring 74a. As shown in FIG. 1C, each force applying member 74, such as in the form of a spring 74a, has a first end 76a coupled to the second end 62b of the center structural portion 60. As further shown in FIG. 1C, each force applying member 74, such as in the form of a spring 74a, has a second end 76b coupled to the bottom end 14b of the housing 12. FIG. 1C shows the force applying members 74, such as in the form of springs 74*a*, in an extended position 78*a*, when the measurement apparatus 10 is in the non-measurement position 80*a*.

Alternatively, if the measurement apparatus 10 does not have a center structural portion 60 (see FIG. 1C), the first end 76*a* (see FIG. 1C) of each force applying member 74, such as in the form of spring 74*a*, may be coupled to the second ends 46*b* (see FIG. 1C) of the conductive measurement probes 44 (see FIG. 1C), and the second end 76*b* (see FIG. 1C) of each force applying member 74, such as in the form of spring 74*a*, may be coupled to the bottom end 14*b* (see FIG. 1C) of the housing 12.

The force applying member 74 (see FIG. 1C) preferably comprises a spring 74*a* (see FIG. 1C). However, the force applying member 74 (see FIG. 1C) may also comprise a leaf spring, a hydraulic device, an air bag, an electromagnetic device, or any type of suitable mechanical system that allows application of a set or consistent pressure. The force applying member 74 (see FIG. 1C), such as in the form of spring 74*a* (see FIG. 1C), applies a biasing force 77 (see FIG. 4) to cause the pair of conductive measurement probes 44 to extend a predetermined distance 82 (see FIG. 1C) beyond the support leg plane 34 (see FIG. 1C). Each of the conductive measurement probes 44 (see FIG. 1C) preferably extends the predetermined distance 82 (see FIG. 1C) of at least 0.25 inches beyond the support leg plane 34 (see FIG. 1C), when the measurement apparatus 10 (see FIG. 1C) is in the non-measurement position 80*a* (see FIG. 1C).

Now referring to FIG. 1D, FIG. 1D is an illustration of a front view of the measurement apparatus of FIG. 1C, in a measurement position 80*b*. As shown in FIG. 1D, in the measurement position 80*b*, the first contact end 46*a* of each conductive measurement probe 44 and the first end 32*a* of each support leg 30, of the measurement apparatus 10, are in contact with a surface 84 of a structure 86. The surface 84 (see FIG. 1D) may comprise a flat surface 84*a*, a contoured surface 84*b* (see FIG. 3C), or another suitable surface. The structure 86 (see FIG. 1D) may comprise an aircraft part 86*a* (see FIG. 1D), an aircraft assembly 86*b* (see FIG. 4), a radome 86*c* (see FIG. 4), or another suitable structure 86 to be measured or tested for conductivity 138 (see FIG. 4) or surface resistivity 136 (see FIG. 4).

As shown in FIG. 1D, the measurement apparatus 10 such as in the form of measurement apparatus 10*a*, comprises the first portion 12*a* and the second portion 12*b* of the housing 12, and comprises the pair of support legs 30, such as in the form of the first support leg 30*a* and the second support leg 30*b*, depending from the housing 12.

FIG. 1D shows the support leg structure 36 comprising the support leg post portion 36*a* and the support leg base portion 36*b*, and shows the outer side 38*a*, the inner side 38*b*, and the front side 39*a* of each support leg 30. FIG. 1D shows the first support leg 30*a* having the first slide rail 56*a* and shows the second support leg 30*b* having the second slide rail 56*b*.

As shown in FIG. 1D, the measurement apparatus 10 such as in the form of measurement apparatus 10*a*, further comprises the pair of conductive measurement probes 44, such as in the form of first conductive measurement probe 44*a* and second conductive measurement probe 44*b*, both slidably disposed between the inner sides 38*b* of the support legs 30. FIG. 1D shows each of the conductive measurement probes 44 having the first contact end 46*a*, the second end 46*b*, and the extending portion 47.

FIG. 1D further shows the center structural portion 60, with the switch 70, coupled between the pair of conductive measurement probes 44. FIG. 1D further shows the force applying members 74, such as in the form of springs 74*a*. FIG. 1D shows the force applying members 74, such as in the form of springs 74*a*, in a compressed position 78*b*, when the measurement apparatus 10 is in the measurement position 80*b*. The predetermined distance 82 showing the pair of conductive measurement probes 44 extending beyond the support leg plane 34 in FIG. 1C is moved upwardly in FIG. 1D, so that the bottom of the predetermined distance 82 is aligned with the first end 32*a* of the support leg 30 and the surface 84.

A downward applied force 146 (see FIGS. 1D, 4) applied to the housing 12 (see FIG. 1D), when the first contact ends 46*a* (see FIG. 1D) of the conductive measurement probes 44 (see FIG. 1D) are in contact with the surface 84 (see FIG. 1D), causes a displacement 144 (see FIG. 4) of the conductive measurement probes 44, until the first ends 32*a* (see FIG. 1D) of the support legs 30 (see FIG. 1D) contact the surface 84, such that compression of the at least one force applying member 74 (see FIG. 1D) by the displacement 144 (see FIG. 4) provides a predetermined probe contact force 149 (see FIGS. 1D, 4) against the surface 84, that is independent of the downward applied force 146 (see FIG. 1D). As a result, conductivity measurements 140 (see FIG. 4) between the conductive measurement probes 44 (see FIG. 1D) are consistently obtained from measurement to measurement to thereby improve conductivity measurement accuracy 142 (see FIG. 4).

The displacement 144 (see FIG. 4) of the conductive measurement probes 44 (see FIG. 1D), until the first ends 32*a* (see FIG. 1D) of the support legs 30 (see FIG. 1D) contact the surface 84 (see FIG. 1D), compresses the at least one force applying member 74 (see FIG. 1D) by a displacement distance 144*a* (see FIG. 4) of at least 0.25 inches to provide the predetermined probe contact force 149 (see FIG. 1D) against the surface 84 (see FIG. 1D) of at least 0.5 pounds.

The design of the measurement apparatus 10 (see FIG. 1D) provides a consistent application 148 (see FIG. 4) of the downward applied force 146 (see FIG. 1D) or pressure on the surface 84 (see FIG. 1D), as the downward applied force 146 (see FIG. 1D) or pressure may be controlled through the force applying elements 74 (see FIG. 1D), such as the springs 74*a* (see FIG. 1D), that maintain a set psi (pounds per square inch) via the springs 74*a* and the stop element 42 (see FIG. 1A). The stop element 42 (see FIG. 1A) controls a surface area angularity 152 (see FIG. 4) between the first contact ends 46*a* (see FIG. 1D) of the conductive measurement probes 44 (see FIG. 1D) and the surface 84 (see FIG. 1D). By controlling the surface area angularity 152 (see FIG. 4) between the first contact ends 46*a* (see FIG. 1D) of the conductive measurement probes 44 (see FIG. 1D), and by controlling the psi, the operator or user may accurately measure the conductivity 138 (see FIG. 4) or surface resistivity 136 (see FIG. 4) between the first contact ends 46*a*, regardless of which operator or user is performing the testing, inspection, or work.

Now referring to FIG. 1E, FIG. 1E is an illustration of a cross-sectional view taken along lines 1E-1E of FIG. 1D. FIG. 1E shows the cross-sectional view of the measurement apparatus 10, such as in the form of measurement apparatus 10*a*, with the through openings 18 extending through the pair of support legs 30 comprising the first support leg 30*a* and the second support leg 30*b*, each support leg 30 comprising the support leg post portion 36*a*, the support leg base portion 36*b*, the outer side 38*a*, the inner side 38*b*, the front side 39*a*, and the back side 39*b*. FIG. 1E further shows the pair of conductive measurement probes 44, such as in the form of the first conductive measurement probe 44a and the second conductive measurement probe 44b, each conductive measurement probes 44 having the front side 52a, the back side 52b, the outer side 54a, and the inner side 54b.

FIG. 1E further shows the slide rails 56, such as the first slide rail 56a and the second slide rail 56b formed on the inner side 38b of each support leg 30, and further shows the slide grooves 57, such as the first slide groove 57a and the second slide groove 57b formed in the outer side 54a of each conductive measurement probe 44. Each slide rail 56 (see FIG. 1E) of each support leg 30 (see FIG. 1E) is configured to slide along each corresponding slide groove 57 (see FIG. 1E) formed in the outer side 54a (see FIG. 1E)) of each conductive measurement probe 44 (see FIG. 1E), such that the conductive measurement probes 44 are slidably disposed between the support legs 30.

FIG. 1E further shows the center structural portion 60 coupled between the inner sides 54b of the conductive measurement probes 44, and further shows the switch 70 and the fastener elements 72, such as in the form of screws 72a, coupled to the center structural portion 60. FIG. 1E further shows five force applying elements 74, such as in the form of five springs 74a. However, the number of force applying elements 74, such as in the form of springs 74a, may be in the amount of one, two, three, four, or more than five force applying elements 74, such as springs 74a.

Now referring to FIG. 1F, FIG. 1F is an illustration of a cross-sectional view taken along lines 1F-1F of FIG. 1D. FIG. 1F shows the cross-sectional view of the measurement apparatus 10, such as in the form of measurement apparatus 10a, with the through openings 18 that extend through the interior 24 and bottom end 14b of the housing 12 and through the pair of support legs 30 comprising the first support leg 30a and the second support leg 30b. FIG. 1F further shows the support leg post portion 36a, the outer side 38a, and the inner side 38b of each support leg 30. FIG. 1F further shows the slide rails 56, such as the first slide rail 56a and the second slide rail 56b formed on the inner side 38b of each support leg 30. FIG. 1F further shows the pair of conductive measurement probes 44, such as in the form of the first conductive measurement probe 44a and the second conductive measurement probe 44b, each conductive measurement probes 44 having the front side 52a, the back side 52b, the outer side 54a, and the inner side 54b. FIG. 1F further shows five force applying elements 74, such as in the form of five springs 74a.

Now referring to FIG. 1G, FIG. 1G is an illustration of a right side view of the measurement apparatus 10, such as in the form of measurement apparatus 10a, of FIG. 1A. As shown in FIG. 1G, the measurement apparatus 10 such as in the form of measurement apparatus 10a, comprises the first portion 12a and the second portion 12b of the housing 12, and comprises the top end 14a and the bottom end 14b of the housing 12, and the through openings 18 in the housing 12. FIG. 1G shows the support leg 30, such as the first support leg 30a, having the first end 32a and the second end 32b, the support leg structure 36 comprising the support leg post portion 36a and the support leg base portion 36b, the outer side 38a, the front side 39a, and the back side 39b. FIG. 1G further shows the support leg opening 40 formed through the outer side 38a of the support leg 30, and shows the stop element 42, such as in the form of machine pin 42a, coupled within the support leg opening 40.

FIG. 1G further shows the conductive measurement probe 44, such as in the form of first conductive measurement probe 44a, the first contact end 46a, the front side 52a, and the back side 52b. As shown in FIG. 1G, the conductive measurement probes 44, such as in the form of first conductive measurement probe 44a, extends the predetermined distance 82 beyond the first end 32a of the support leg 30. FIG. 1G further shows the right side view of the switch 70 and the fastener element 72, such as in the form of screw 72a.

Figure 1H:
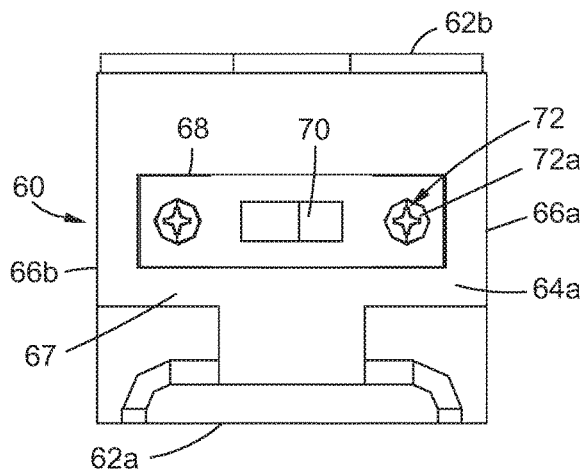
FIG. 1H is an illustration of an enlarged front view of the center structural portion of outlined portion 1H of FIG. 1D.

Now referring to FIG. 1H, FIG. 1H is an illustration of an enlarged front view of the center structural portion 60 of outlined portion 1H of FIG. 1D. FIG. 1H shows the first end 62a, the second end 62b, the front side 64a, the first side 66a, and the second side 66b. The center structural portion 60 (see FIG. 1H) has a cover portion 67 (see FIG. 1H) attached on the front side 64a (see FIG. 1H). FIG. 1H further shows the switch plate 68 attached to the cover portion 67 via fastener elements 72, such as in the form of screws 72a. FIG. 1H further shows the switch 70 through the switch plate 68.

Figure 1J:
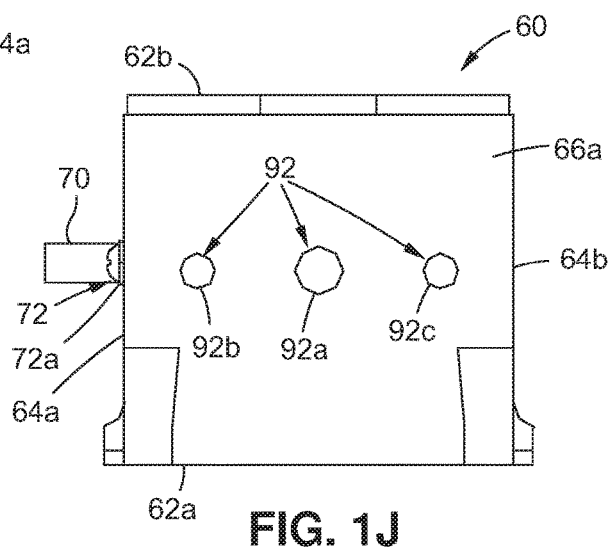
FIG. 1J is an illustration of a right side view of the center structural portion of FIG. 1H.
Figure 1I:
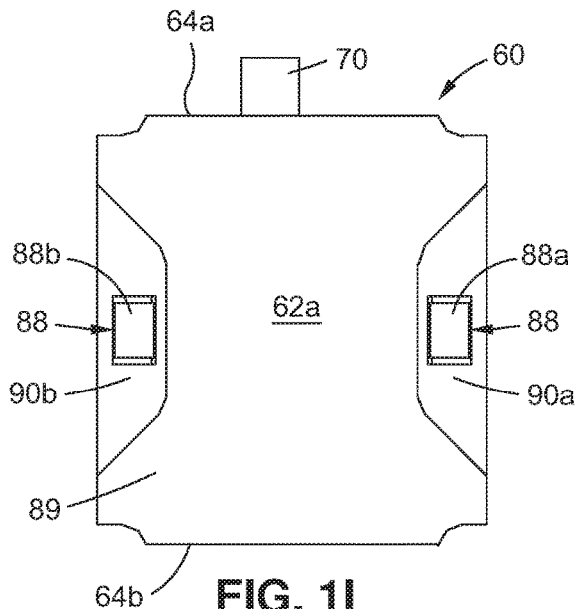
FIG. 1I is an illustration of a bottom view of the center structural portion of FIG. 1H.

Now referring to FIG. 1I, FIG. 1I is an illustration of a bottom view of the center structural portion 60 of FIG. 1H. The center structural portion 60 (see FIG. 1I) may house one or more light emitting elements 88 (see FIG. 1I) in electrical connection with at least one of the conductive measurement probes 44 (see FIGS. 1A-1G). Preferably, the one or more light emitting elements 88 (see FIG. 1I) comprise light emitting diodes (LEDs), for example, a first light emitting diode 88a (see FIG. 1I) and a second light emitting diode 88b (see FIG. 1I). As shown in FIG. 1I, the light emitting element 88, such as in the form of first light emitting diode 88a, is located at a first portion 90a on the first end 62a, and the light emitting element 88, such as in the form of second light emitting diode 88b, is located at a second portion 90b on the first end 62a. The one or more light emitting elements 88 (see FIG. 1I) are configured to illuminate the surface 86 (see FIG. 1D) directly under the measurement apparatus 10 (see FIG. 1D), when a sufficient amount of the downward applied force 146 (see FIG. 1D) is applied to the housing 12, to cause the displacement 144 (see FIG. 4) of the conductive measurement probes 44 (see FIG. 1D), until the first ends 32a (see FIG. 1D) of the support legs 30 (see FIG. 1D) contact the surface 84 (see FIG. 1D).

The measurement apparatus 10 (see FIG. 1A) allows visibility to accurately position the direct conductivity conductive measurement probes 44 (see FIG. 1A) before and during testing, evaluation, and inspection. The direct current (DC) testing of a structure 86 (see FIG. 1D), such as an aircraft part 86a (see FIG. 1D) or aircraft assembly 86b (see FIG. 4) is controlled through visual placement of the conductive measurement probes 44 (see FIG. 1D) of the measurement apparatus 10 (see FIG. 1D) on the aircraft part 86a or aircraft assembly 86b. The visual placement of manually positioning the conductive measurement probes 44 (see FIG. 1D) of the measurement apparatus 10 (see FIG. 1D) on the aircraft part 86a or aircraft assembly 86b indicates a pass or fail electrical resistance and conductivity. By providing an illuminating aperture 87 (see FIG. 4) between the first contact ends 46a (see FIG. 1D) of the conductive measurement probes 44 (see FIG. 1D), such as the positive and negative conductivity probes, an operator may have light amplification 155 (see FIG. 4) and enhanced visibility 156 (see FIG. 4) under and between the conductive measurement probes 44 (see FIG. 1D) to allow the operator to place the first contact ends 46a (see FIG. 1D) of the conductive measurement probes 44 (see FIG. 1D) accurately on the surface 84 (see FIG. 1D) of the aircraft part 86a (see FIG. 1D) or aircraft assembly 86b (see FIG. 4). This also frees the operator from having to use an indirect lighting sources, for example, a separate hand-held light, overhead lighting, or floor or table mounted portable lighting systems.

FIG. 1I further shows the front side 64a and the back side 64b of the center structural portion 60, and the switch 70 extending from the front side 64a. FIG. 1I further shows a removable bottom cover 89 on the first end 62a of the center structural portion 60. Batteries (not shown) or another power source may be taken in and out of the center structure portion 60 by removing the removable bottom cover 89.

Now referring to FIG. 1J, FIG. 1J is an illustration of a right side view of the center structural portion 60 of FIG. 1H. FIG. 1J shows the first end 62a, the second end 62b, the front side 64a, the back side 64b, the first side 66a, and the second side 66b of the center structural portion 60. FIG. 1J further shows the switch 70 and the fastener elements 72, such as in the form of screws 72a. The center structural portion 60 (see FIG. 1J) may have one or more side openings 92, such as a first central side opening 92a, a second side opening 92b, and a third side opening 92c, located on the first side 66a of the center structural portion 60.

Figure 1K:
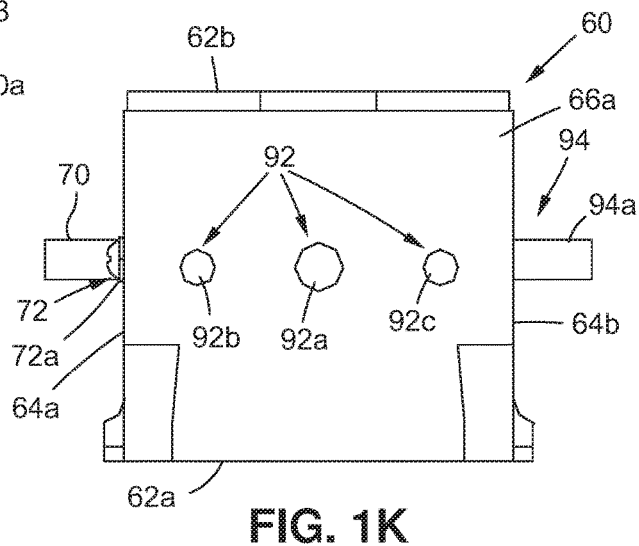
FIG. 1K is an illustration of a right side view of the center structural portion of FIG. 1J, where the center structural portion further has an alignment element in the form of a laser.

Now referring to FIG. 1K, FIG. 1K is an illustration of a right side view of the center structural portion 60 of FIG. 1J, where the center structural portion 60 preferably further has an alignment element 94, such as in the form of a laser 94a, coupled to the back side 64b of the center structural portion 60. The alignment element 94 (see FIG. 1K), such as in the form of laser 94a (see FIG. 1K), is configured to align the measurement apparatus 10 (see FIG. 1D) with the surface 84 (see FIG. 1D) of the structure 86 (see FIG. 1D) to be measured, when the measurement apparatus 10 (see FIG. 1D) scans the surface 84 of the structure 86.

FIG. 1K shows the first end 62a, the second end 62b, the front side 64a, the back side 64b, and the first side 66a of the center structural portion 60. FIG. 1K further shows the switch 70 and the fastener elements 72, such as in the form of screws 72a. FIG. 1K further shows the one or more side openings 92, such as a first central side opening 92a, a second side opening 92b, and a third side opening 92c, located on the first side 66a of the center structural portion 60.

Figure 2A:
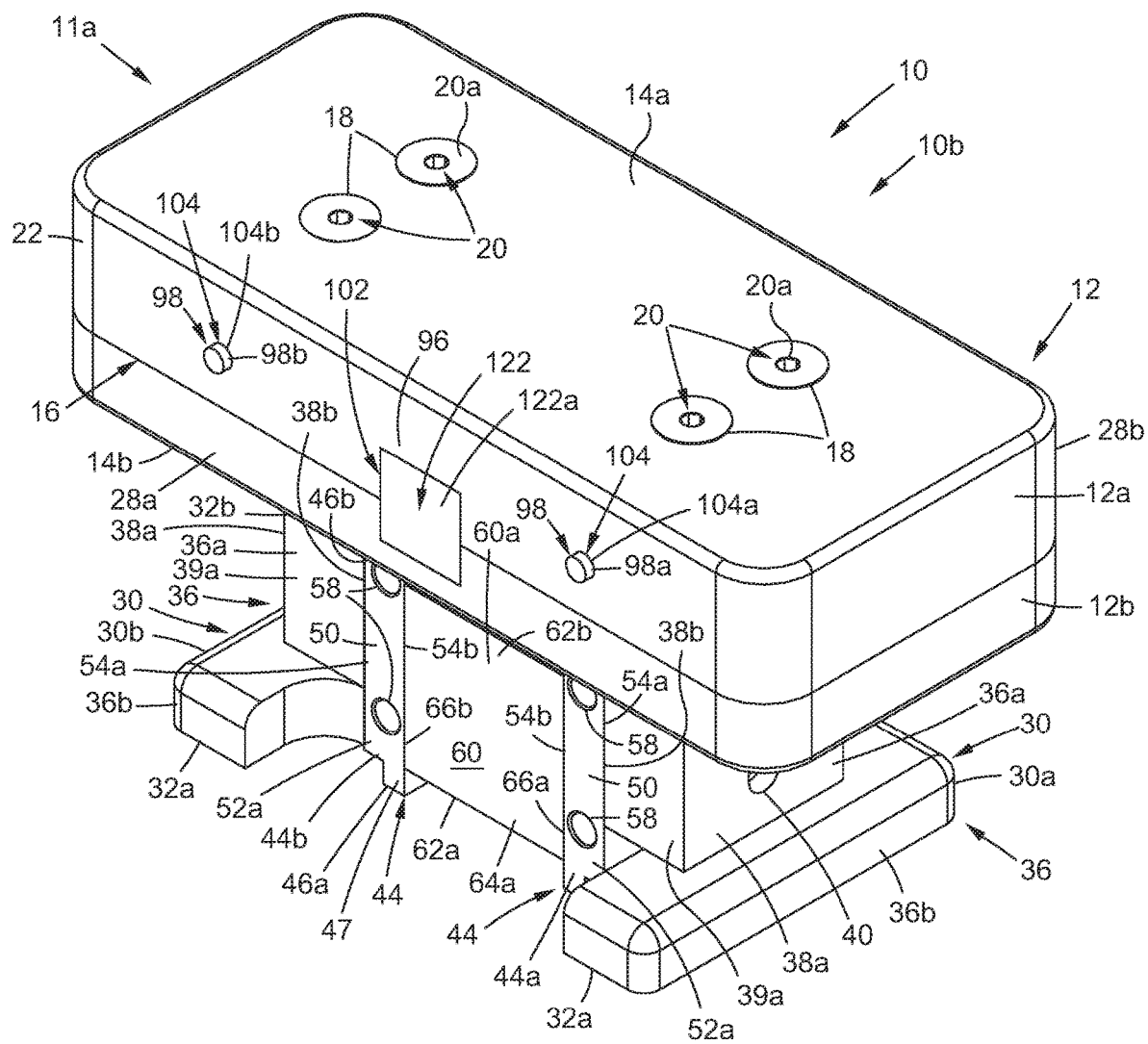
FIG. 2A is an illustration of a front perspective view of another exemplary version of a measurement apparatus of the disclosure, in the form of a set increment measurement apparatus that is wireless.
Figure 2B:
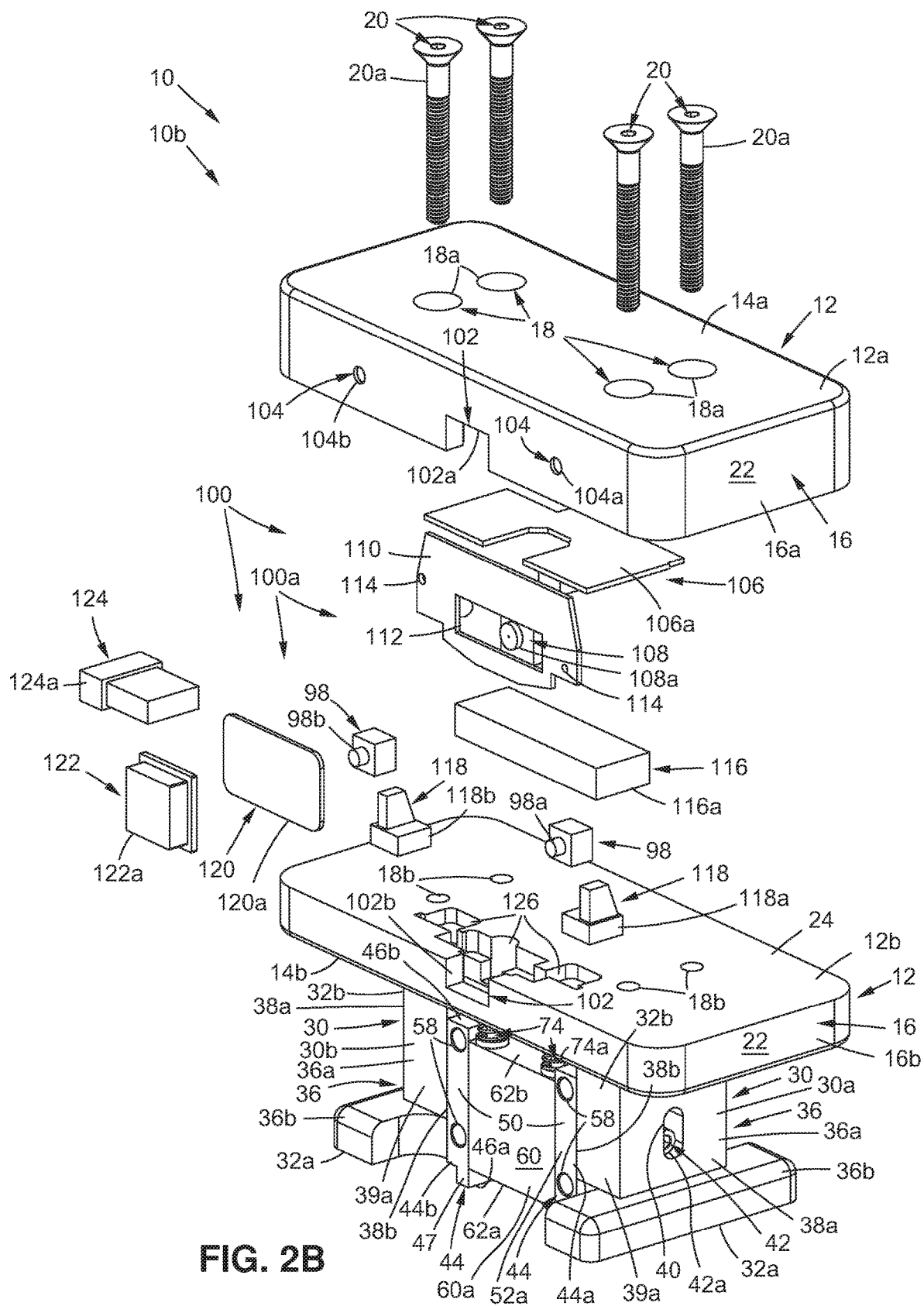
FIG. 2B is an illustration of an exploded front perspective view of the measurement apparatus of FIG. 2A.
Figure 2C:
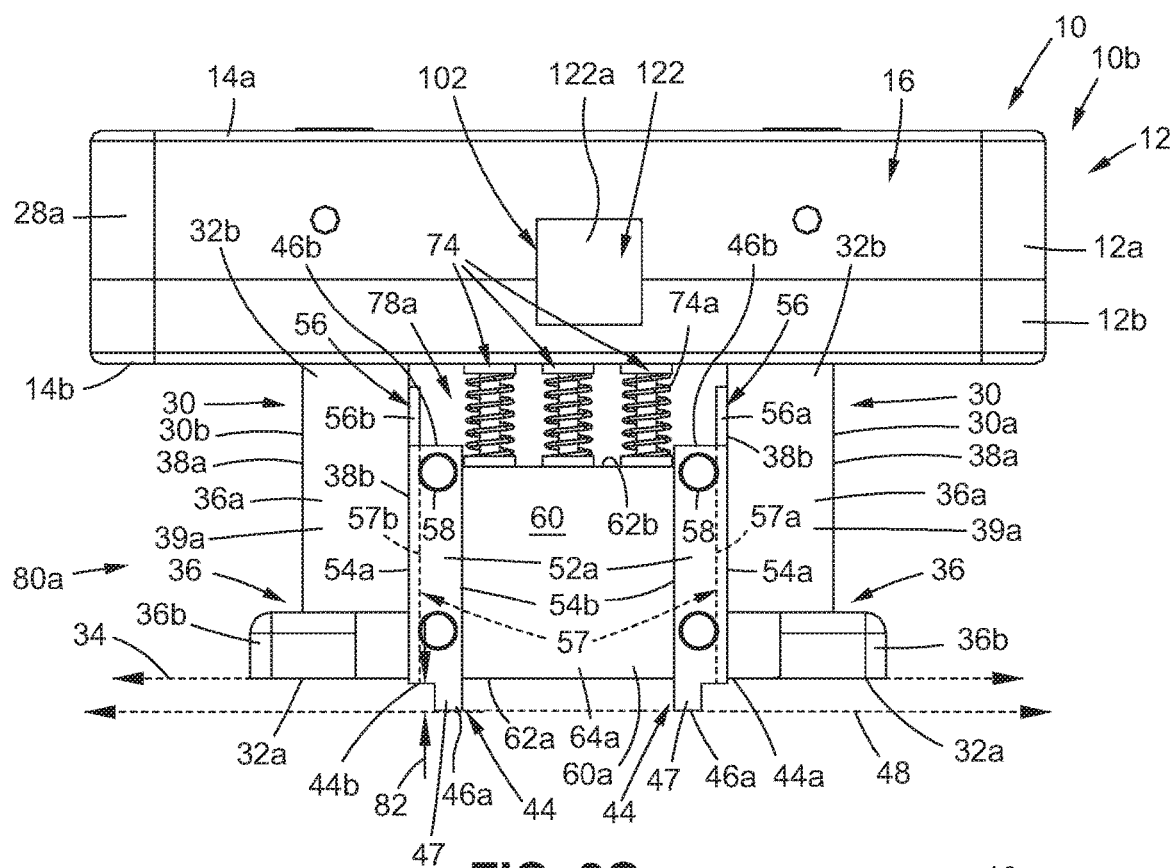
FIG. 2C is an illustration of a front view of the measurement apparatus of FIG. 2A, in a non-measurement position.
Figure 2D:
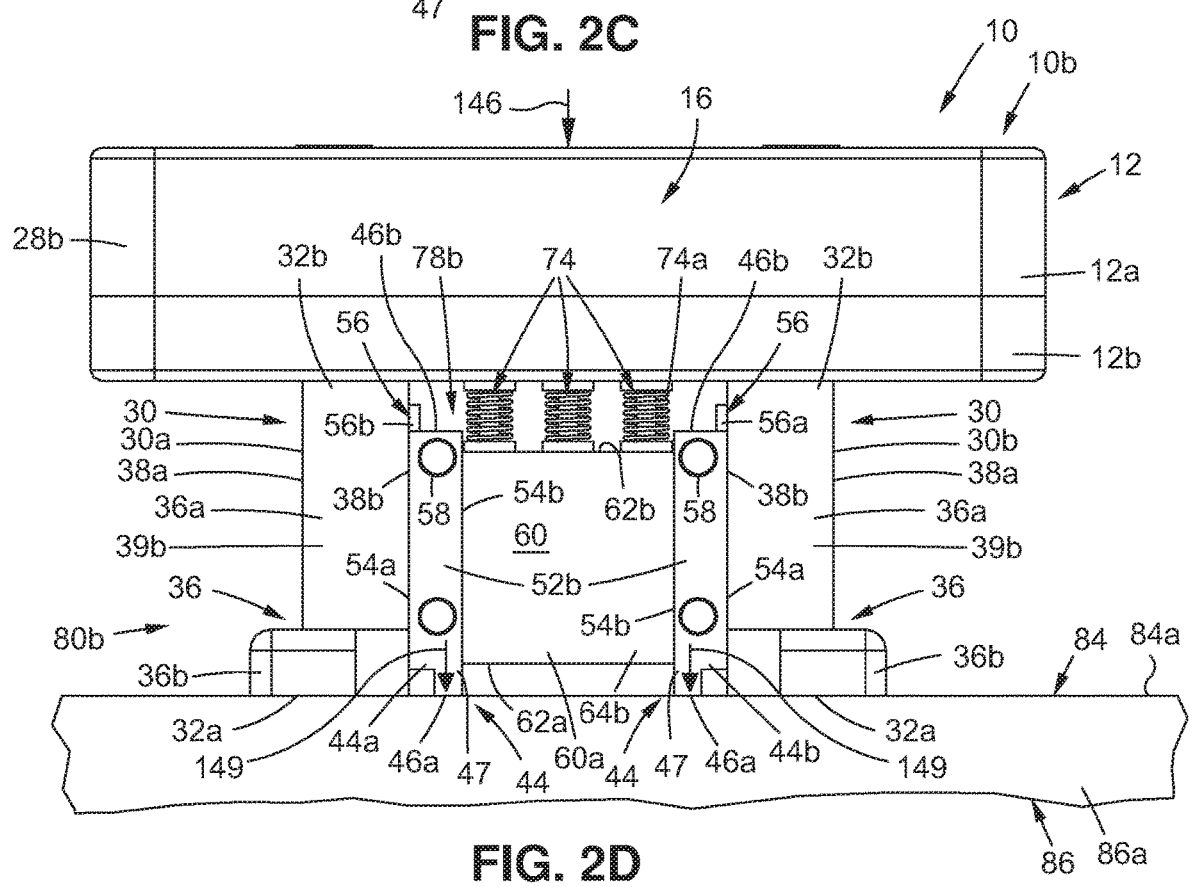
FIG. 2D is an illustration of a back view of the measurement apparatus of FIG. 2C, in a measurement position.
Figure 2E:
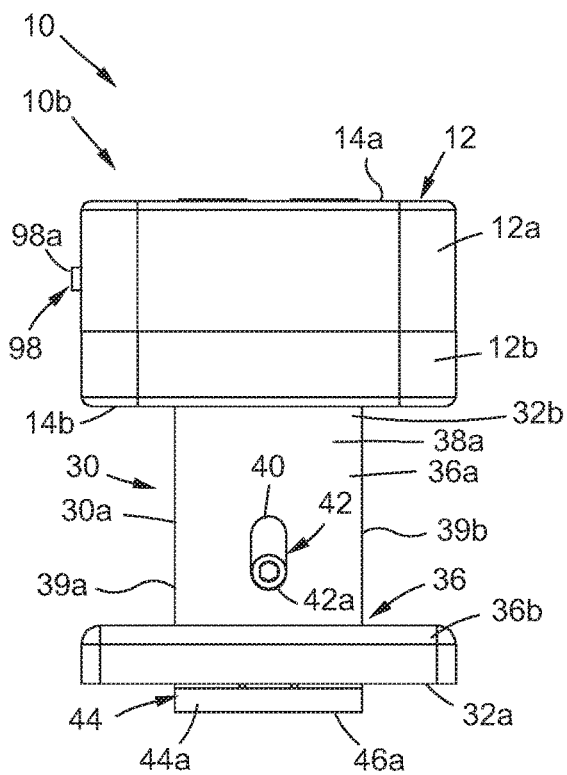
FIG. 2E is an illustration of a right side view of the measurement apparatus of FIG. 2A.
Figure 2F:
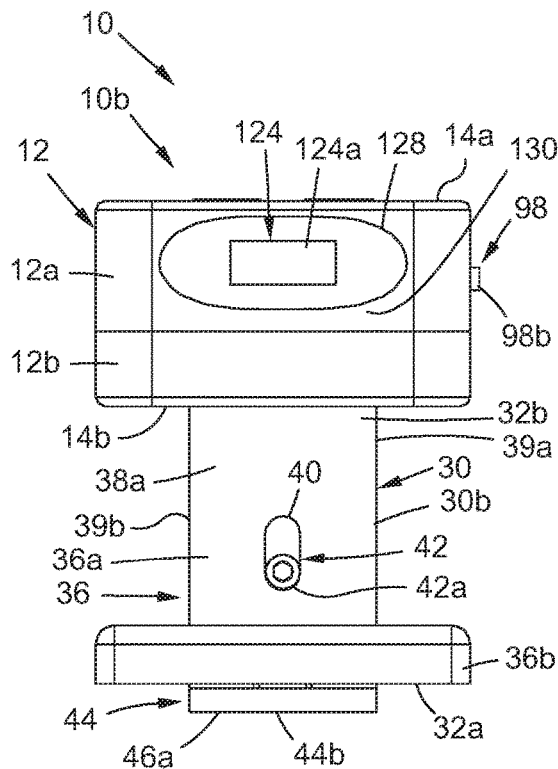
FIG. 2F is an illustration of a left side view of the measurement apparatus of FIG. 2A.
Figure 2G:
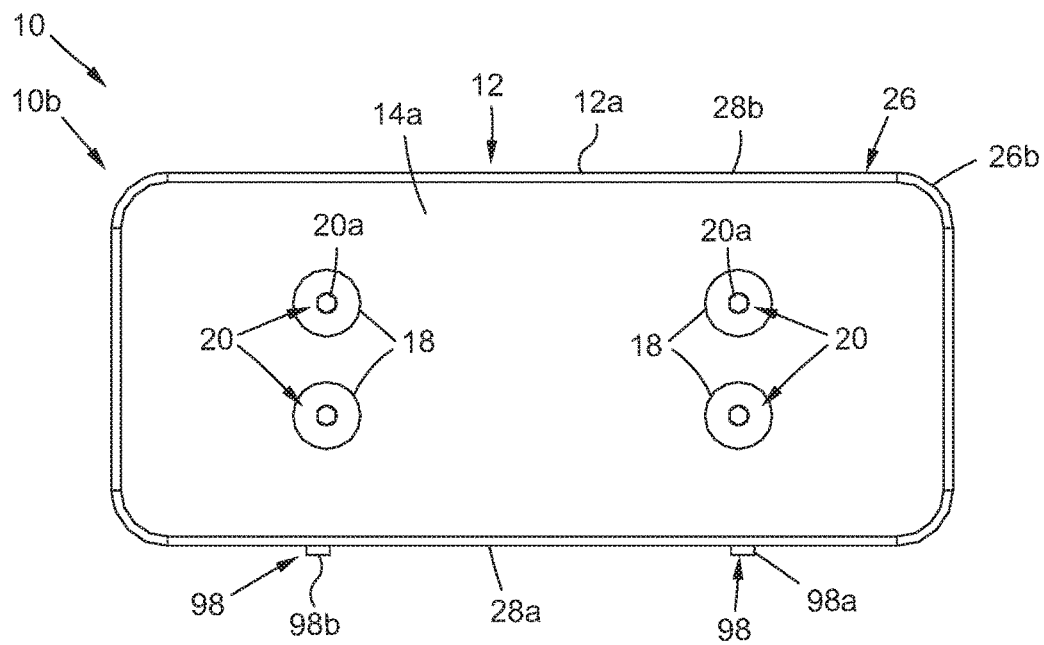
FIG. 2G is an illustration of a top view of the measurement apparatus of FIG. 2A.

Now referring to FIGS. 2A-2G, in another version there is provided a measurement apparatus 10, such as in the form of measurement apparatus 10b, for obtaining conductivity measurements 140 (see FIG. 4) of a surface 84 (see FIG. 2D) of a structure 86 (see FIG. 2D). FIG. 2A is an illustration of a front perspective view of another exemplary version of the measurement apparatus 10, such as in the form of measurement apparatus 10b, where the measurement apparatus 10 is wireless. As shown in FIG. 2A, in this version, the measurement apparatus 10 is a set increment measurement apparatus 11a. FIG. 2B is an illustration of an exploded front perspective view of the measurement apparatus 10 of FIG. 2A.

As shown in FIGS. 2A-2B, the measurement apparatus 10, such as in the form of measurement apparatus 10b, comprises the housing 12 having the first portion 12a and the second portion 12b. The housing 12 (see FIGS. 2A-2B) has the top end 14a (see FIGS. 2A-2B), the bottom end (see FIGS. 2A-2B), the body 16 (see FIGS. 2A-2B) formed in between the top end 14a and the bottom end 14b, the front end 28a (see FIG. 2A), and the back end 28b (see FIG. 2A). The body 16 (see FIG. 2B) may comprise a first body portion 16a (see FIG. 2B) and a second body portion 16b (see FIG. 2B).

As shown in FIGS. 2A-2B, the housing 12 preferably has one or more through openings 18 formed through the housing 12, where each through opening 18 preferably has an attachment element 20, such as in the form of a bolt 20a, inserted through the through opening 18. Alternatively, the attachment element 20 (see FIGS. 2A-2B) may comprise a screw, a rivet, a fastener, or another suitable attachment element 20.

As shown in FIG. 2B, the through openings 18 comprise first housing portion through openings 18a formed in the first portion 12a of the housing 12 and corresponding second housing portion through openings 18b formed in the second portion 12b of the housing 12. FIGS. 2A-2B show the top end 14a of the first portion 12a of the housing 12 having four through openings 18 with four corresponding attachment elements 20, such as in the form of bolts 20a, where each bolt 20a is inserted into each respective through opening 18. Although FIGS. 2A-2B show four through openings 18 and four corresponding attachment elements 20, the housing 12 may have one, two, three, or more than four through openings 18 and corresponding attachment elements 20.

FIGS. 2A-2B show an exterior 22 of the housing 12. FIG. 2B shows an interior 24 of the housing 12. As further shown in FIGS. 2A-2B, an opening 102 is formed through the housing 12, where the opening 102 comprises a first half 102a formed in the first portion 12a of the housing 12 and comprises a second half 102b formed in the second portion 12b of the housing 12. The opening 102 (see FIG. 2B) is preferably of a sufficient size and configuration to have an optical sensor protective lens 122, such as in the form of a manually operated optical sensor protective lens 122a, inserted through the opening 102 and positioned at a location 96 (see FIG. 2A) on the exterior 22 of the housing 12.

As further shown in FIGS. 2A-2B, one or more tactile switch openings 104, such as in the form of a first tactile switch opening 104a and a second tactile switch opening 104b, may be formed through the first portion 12a of the housing 12. FIGS. 2A-2B further show tactile switches 98, such as a first tactile switch 98a and a second tactile switch 98b. FIG. 2A shows the first tactile switch 98a inserted through the first tactile switch opening 104a, and shows the second tactile switch 98b inserted through the second tactile switch opening 104b.

As shown in FIGS. 2A-2B, the measurement apparatus 10, such as in the form of measurement apparatus 10b, further comprises the pair of support legs 30 depending from the housing 12. The support legs 30 (see FIGS. 2A-2B) comprise the first support leg 30a (see FIGS. 2A-2B) and the second support leg 30b (see FIGS. 2A-2B). As shown in FIGS. 2A-2B, each support leg 30 has the first end 32a and the second end 32b, and has the support leg structure 36 comprising the support leg post portion 36a coupled to the support leg base portion 36b.

As further shown in FIGS. 2A-2B, each support leg 30 has the outer side 38a, the inner side 38b, the front side 39a, the back side 39b (see FIG. 2E), the support leg opening 40 formed in the outer side 38a, and the stop element 42 (see FIG. 2B) or travel stop, such as in the form of the machine pin 42a (see FIG. 2B), or other suitable stop element 42, inserted through and coupled within the support leg opening 40 (see FIG. 2B). The stop element 42 (see FIG. 2B), such as in the form of the machine pin 42a (see FIG. 2B), is configured to limit the displacement 144 (see FIG. 4) of the slide rail 56 (see FIG. 2C) of each support leg 30 sliding along the corresponding slide groove 57 (see FIG. 2C) formed in each of the pair of conductive measurement probes 44 (see FIGS. 2A, 2C). The conductive measurement probes 44 (see FIG. 2B) may be independently sliding from each other, as long as they provide the same contact pressure on the surface 84 (see FIG. 2D) of the structure 86 (see FIG.

2D), via at least one force applying member 74 (see FIGS. 2C-2D), such as in the form of a spring 74a (see FIGS. 2C-2D).

As shown in FIGS. 2A-2B, the measurement apparatus 10, such as in the form of measurement apparatus 10b, further comprises the pair of conductive measurement probes 44, such as in the form of the first conductive measurement probe 44a and the second conductive measurement probe 44b, both slidably disposed between the inner sides 38b of the support legs 30. FIGS. 2A-2B show the first contact end 46a, the second end 46b, the extending portion 47, the probe body 50, the front side 52a, the back side 52b (see FIG. 2D), the outer side 54a (see FIG. 2A), the inner side 54b (see FIG. 2A), and one or more probe openings 58.

As shown in FIGS. 2A-2B, the measurement apparatus 10, such as in the form of measurement apparatus 10b, may further comprise the center structural portion 60, such as in the form of the center block 60a, coupled between the inner sides 54b (see FIG. 2A) of the conductive measurement probes 44. The center structural portion 60 (see FIGS. 2A-2B), such as in the form of center block 60a (see FIGS. 2A-2B), has the first end 62a (see FIGS. 2A-2B), the second end 62b (see FIGS. 2A-2B), the front side 64a (see FIG. 2A), the back side 64b (see FIG. 2D), the first side 66a (see FIG. 2A) adjacent the inner side 54b of the first conductive measurement probe 44a, and the second side 66b (see FIG. 2A) adjacent the inner side 54b of the second conductive measurement probe 44b.

As shown in FIG. 2B, the measurement apparatus 10, such as in the form of measurement apparatus 10b, further comprises at least one force applying member 74. Preferably, the force applying member 74 comprises a spring 74a. However, the force applying member 74 (see FIG. 2B) may also comprise a leaf spring, a hydraulic device, an air bag, an electromagnetic device, or any type of suitable mechanical system that allows application of a set or consistent pressure. This version of the measurement apparatus 10, such as in the form of measurement apparatus 10b, is wireless and has a wireless capability 101 (see FIG. 4). FIG. 2B shows an internal housing assembly 100, such as in the form of a wireless assembly 100a. The internal housing assembly 100 (see FIG. 2B) may comprise manually operated user select equipment integrated into a direct current (DC) measurement apparatus 10 (see FIG. 2B) for measuring, testing, and inspecting the surface (see FIG. 2D) of the structure 86 (see FIG. 2D).

As shown in FIG. 2B, the wireless assembly 100a may comprise a circuit board 106, such as a manually operated circuit board 106a; an optical sensor 108, such as a manually operated optical sensor 108a; and a cover plate 110 for the optical sensor 108, where the cover plate 110 has a window opening 112 and attachment openings 114 on each side of the window opening 112. As shown in FIG. 2B, the wireless assembly 100a may further comprise a power source 116, such as a battery 116a or other suitable power source, and one or more tactile switch retainers 118, such as in the form of a first tactile switch retainer 118a and a second tactile switch retainer 118b, for retaining the first tactile switch 98a and second tactile switch 98b, respectively.

As shown in FIG. 2B, the wireless assembly 100a may further comprise an optical sensor lens 120, such as in the form of a manually operated optical sensor lens 120a; an optical sensor protective lens 122, such as in the form of a manually operated optical sensor protective lens 122a; and a wireless adapter element 124, such as in the form of a universal serial bus (USB) wireless adapter 124a. One or more components of the wireless assembly 100a (see FIG. 2B) may be retained in a plurality of recessed portions 126 (see FIG. 2B) formed in the interior 24 (see FIG. 2B) of the housing 12 (see FIG. 2B), such as the second portion 12b (see FIG. 2B) of the housing 12. The wireless assembly 100a (see FIG. 2B) may be used with an optical mouse 125 (see FIG. 4), such as in the form of a wireless infrared (IR) optical mouse 125a (see FIG. 4).

Now referring to FIGS. 2C and 2D, FIG. 2C is an illustration of a front view of the measurement apparatus 10, such as in the form of measurement apparatus 10b, of FIG. 2A, in a non-measurement position 80a, and FIG. 2D is an illustration of a back view of the measurement apparatus 10, such as in the form of measurement apparatus 10b, of FIG. 2C, in a measurement position 80b.

FIGS. 2C-2D show the measurement apparatus 10, such as in the form of measurement apparatus 10b, comprising the first portion 12a and the second portion 12b of the housing 12. FIG. 2C shows the front end 28a of the housing 12 having the opening 102 surrounding the optical sensor protective lens 122, and shows the top end 14a, the bottom end 14b, and the body 16 therebetween. FIG. 2D shows the back end 28b of the housing 12 and the body 16.

FIGS. 2C-2D further show the pair of support legs 30 comprising the first support leg 30a (see FIG. 1C) and the second support leg 30b (see FIG. 1C), where each support leg 30 has the first end 32a and the second end 32b. As shown in FIG. 2C, the first ends 32a of the support leg 30 define the support leg plane 34. As further shown in FIGS. 2C-2D, each of the support legs 30 has the support leg structure 36 comprising the support leg post portion 36a and the support leg base portion 36b. Each support leg 30 (see FIGS. 2C-2D) further has the outer side 38a (see FIGS. 2C-2D), the inner side 38b (see FIGS. 2C-2D), and the front side 39a (see FIGS. 2C-2D). FIGS. 2C-2D further show the slide rails 56 formed longitudinally along the inner side 38b of each support leg 30, where the first support leg 30a has the first slide rail 56a and the second support leg 30b has the second slide rail 56b.

FIGS. 2C-2D further show the pair of conductive measurement probes 44, such as in the form of first conductive measurement probe 44a and second conductive measurement probe 44b, both slidably disposed between the inner sides 38b of the support legs 30. As shown in FIGS. 2C-2D the conductive measurement probes 44 each have the first contact end 46a, the second end 46b, the extending portion 47, the front side 52a (see FIG. 2C), the back side 52b (see FIG. 2D), the outer side 54a, the inner side 54b, and one or more probe openings 58. As shown in FIG. 2C, the first contact ends 46a define the probe plane 48. As further shown in FIG. 2C, each conductive measurement probe 44 has the slide groove 57, where the first conductive measurement probe 44a has the first slide groove 57a and the second conductive measurement probe 44b has the second slide groove 57b.

FIGS. 2C-2D further show the center structural portion 60, such as in the form of the center block 60a, coupled between the pair of conductive measurement probes 44, such as the first conductive measurement probe 44a and second conductive measurement probe 44b. As further shown in FIGS. 2C-2D, the center structural portion 60 has the first end 62a, the second end 62b, the front side 64a (see FIG. 2C), and the back side 64b (see FIG. 2D).

FIGS. 2C-2D further show the force applying members 74, such as in the form of springs 74a, coupled between the second end 62b of the center structural portion 60 and the bottom end 14b of the housing 12. Alternatively, if the measurement apparatus 10 does not have a center structural portion 60 (see FIG. 2C), the force applying member 74 (see FIG. 2C), such as in the form of spring 74a (see FIG. 2C), may be coupled between the second ends 46b (see FIG. 2C) of the conductive measurement probes 44 (see FIG. 2C), and the bottom end 14b (see FIG. 2C) of the housing 12 (see FIG. 2C).

FIG. 2C shows the force applying members 74, such as in the form of springs 74a, in the extended position 78a, when the measurement apparatus 10 is in the non-measurement position 80a. FIG. 2D shows the force applying members 74, such as in the form of springs 74a, in the compressed position 78b, when the measurement apparatus 10 is in the measurement position 80b.

The force applying members 74 (see FIG. 2C), such as in the form of springs 74a (see FIG. 2C), apply a biasing force 77 (see FIG. 4) to cause the pair of conductive measurement probes 44 to extend a predetermined distance 82 (see FIG. 2C) beyond the support leg plane 34 (see FIG. 2C). Each of the conductive measurement probes 44 (see FIG. 2C) preferably extends the predetermined distance 82 (see FIG. 2C) of at least 0.25 inches beyond the support leg plane 34 (see FIG. 2C), when the measurement apparatus 10 (see FIG. 2C) is in the non-measurement position 80a (see FIG. 2C).

As shown in FIG. 2D, in the measurement position 80b, the first contact end 46a of each conductive measurement probe 44 and the first end 32a of each support leg 30, of the measurement apparatus 10, are in contact with a surface 84 of a structure 86. The surface 84 (see FIG. 2D) may comprise a flat surface 84a (see FIG. 2D), a contoured surface 84b (see FIG. 3C), or another suitable surface. The structure 86 (see FIG. 2D) may comprise an aircraft part 86a (see FIG. 2D), an aircraft assembly 86b (see FIG. 4), a radome 86c (see FIG. 4), or another suitable structure 86 to be measured or tested for conductivity 138 (see FIG. 4) or surface resistivity 136 (see FIG. 4).

The predetermined distance 82 showing the pair of conductive measurement probes 44 extending beyond the support leg plane 34 in FIG. 2C is moved upwardly in FIG. 2D, so that the bottom of the predetermined distance 82 (see FIG. 2C) is aligned with the first end 32a of the support leg 30 and the surface 84 (see FIG. 2D).

As shown in FIG. 2D, a downward applied force 146 applied to the housing 12, when the first contact ends 46a of the conductive measurement probes 44 are in contact with the surface 84, causes a displacement 144 (see FIG. 4) of the conductive measurement probes 44, until the first ends 32a of the support legs 30 contact the surface 84, such that compression of the force applying members 74 by the displacement 144 (see FIG. 4) provides a predetermined probe contact force 149 against the surface 84, that is independent of the downward applied force 146. As a result, conductivity measurements 140 (see FIG. 4) between the conductive measurement probes 44 (see FIG. 2D) are consistently obtained from measurement to measurement to thereby improve conductivity measurement accuracy 142 (see FIG. 4).

The displacement 144 (see FIG. 4) of the conductive measurement probes 44 (see FIG. 2D), until the first ends 32a (see FIG. 2D) of the support legs 30 (see FIG. 2D) contact the surface 84 (see FIG. 2D), compresses the force applying members 74 (see FIG. 2D) by a displacement distance 144a (see FIG. 4) of at least 0.25 inches to provide the predetermined probe contact force 149 (see FIG. 2D) against the surface 84 (see FIG. 2D) of at least 0.5 pounds.

Now referring to FIGS. 2E-2F, FIG. 2E is an illustration of a right side view of the measurement apparatus 10, such as in the form of measurement apparatus 10b, of FIG. 2A, and FIG. 2F is an illustration of a left side view of the measurement apparatus 10, such as in the form of measurement apparatus 10b, of FIG. 2A.

FIGS. 2E-2F show the first portion 12a and the second portion 12b of the housing 12, show the top end 14a and the bottom end 14b of the housing 12, and show the tactile switches 98, such as the first tactile switch 98a (see FIG. 2E) and the second tactile switch 98b (see FIG. 2F). FIG. 2F further shows the wireless adapter element 124, such as in the form of the universal serial bus (USB) wireless adapter 124a, and a USB port 128 at a location 130 on the first portion 12a of the housing 12.

FIGS. 2E-2F further show the support leg 30, such as the first support leg 30a (see FIG. 2E), and the second support leg 30b (see FIG. 2E), each support leg 30 having the first end 32a, the second end 32b, the support leg structure 36 comprising the support leg post portion 36a and the support leg base portion 36b, the outer side 38a, the front side 39a, the back side 39b, the support leg opening 40 formed through the outer side 38a, and the stop element 42, such as in the form of machine pin 42a, coupled within the support leg opening 40. FIGS. 2E-2F further show the conductive measurement probe 44, such as in the form of first conductive measurement probe 44a (see FIG. 2E) and second conductive measurement probe 44b (see FIG. 2F), each having the first contact end 46a.

Now referring to FIG. 2G, FIG. 2G is an illustration of a top view of the measurement apparatus, such as in the form of measurement apparatus 10b, of FIG. 2A. FIG. 2G shows the top end 14a of the first portion 12a of housing 12 having four through openings 18 with four corresponding attachment elements 20, such as in the form of bolts 20a, where each bolt 20a is inserted into each respective through opening 18. FIG. 2G further shows the front end 28a of the housing 12, the back end 28b of the housing 12, and the tactile switches 98, such as the first tactile switch 98a and the second tactile switch 98b, coupled to the housing 12. In this version, the housing 12 (see FIG. 2G) has a housing cross-section configuration 26 (see FIG. 2G), such as in the form of a rectangular cross-section configuration 26b. Alternatively, the housing cross-section configuration 26 may comprise another shape or configuration.

Figure 3B:
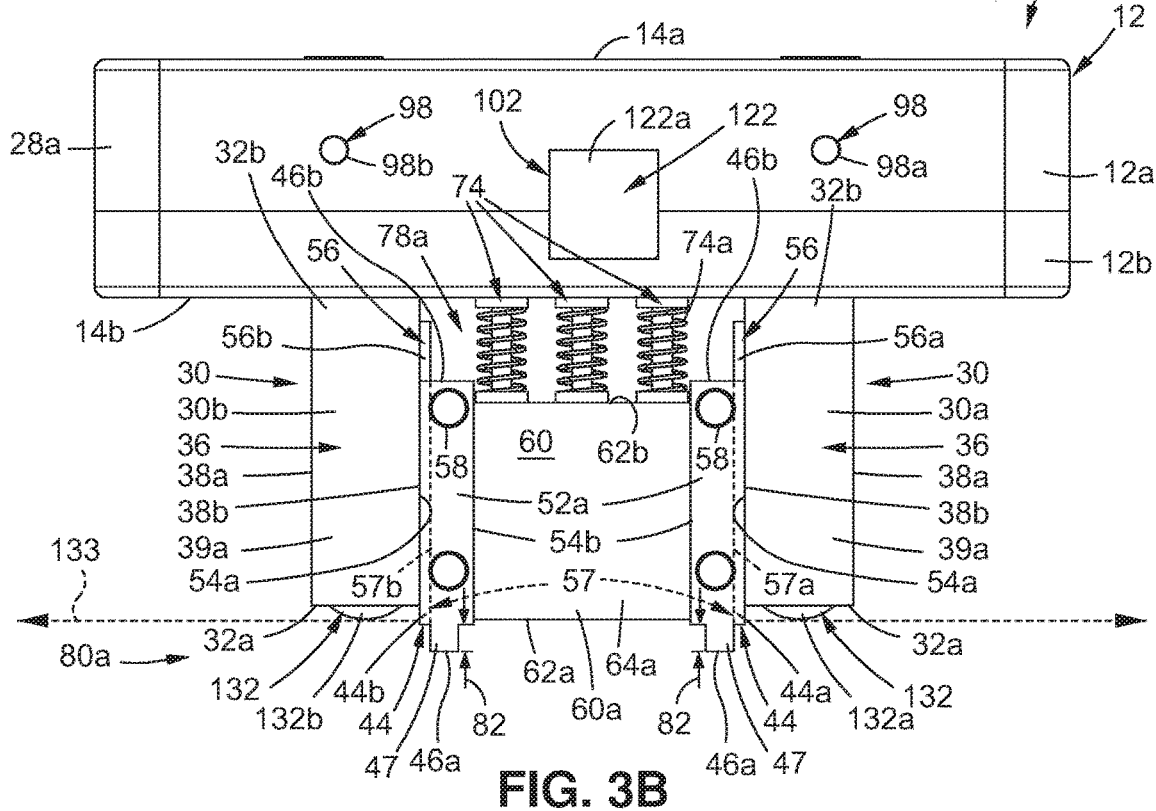
FIG. 3B is an illustration of a front view of the measurement apparatus of FIG. 3A, in a non-measurement position.
Figure 3C:
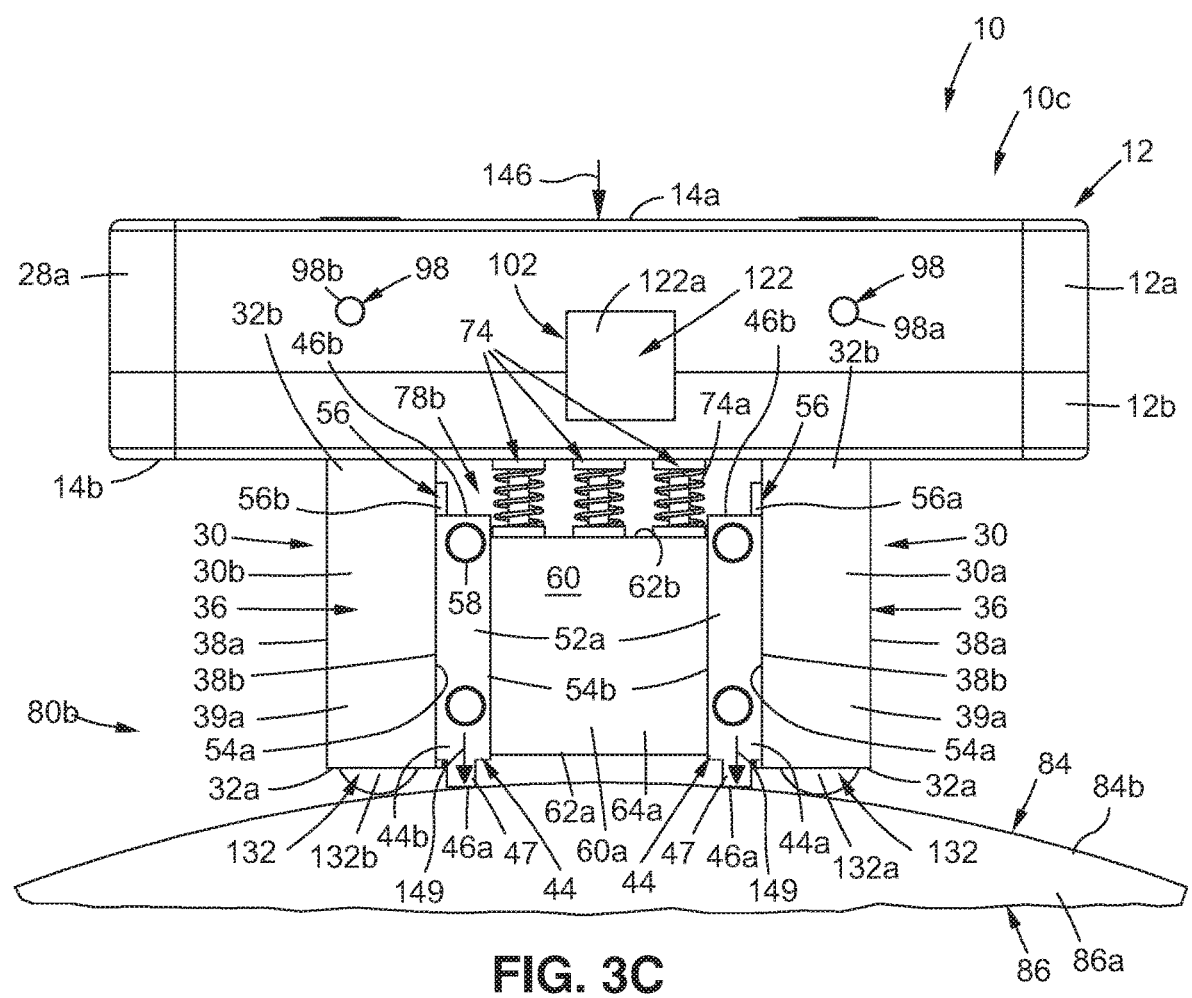
FIG. 3C is an illustration of a front view of the measurement apparatus of FIG. 3B, in a measurement position.

Now referring to FIGS. 3A-3G, in another version there is provided a measurement apparatus 10, such as in the form of measurement apparatus 10c, for obtaining conductivity measurements 140 (see FIG. 4) of a surface 84 (see FIG. 3C) of a structure 86 (see FIG. 3C). FIG. 3A is an illustration of a front perspective view of yet another exemplary version of a measurement apparatus 10, such as in the form of measurement apparatus 10c, of the disclosure, in the form of a variable increment measurement apparatus 11b.

As shown in FIG. 3A, the measurement apparatus 10, such as in the form of measurement apparatus 10c, comprises the housing 12 having the first portion 12a and the second portion 12b. The housing 12 (see FIG. 3A) has the top end 14a (see FIG. 3A), the bottom end (see FIG. 3A), the body 16 (see FIG. 3A) formed in between the top end 14a and the bottom end 14b, the front end 28a (see FIG. 3A), and the back end 28b (see FIG. 3A).

As further shown in FIG. 3A, the housing 12 preferably has one or more through openings 18 formed through the housing 12, where each through opening 18 preferably has the attachment element 20, such as in the form of a bolt 20a, inserted through the through opening 18. Alternatively, the attachment element 20 (see FIG. 3A) may comprise a screw, a rivet, a fastener, or another suitable attachment element 20.

FIG. 3A shows the top end 14a of the first portion 12a of the housing 12 having four through openings 18 with four corresponding attachment elements 20, such as in the form of bolts 20a, where each bolt 20a is inserted into each respective through opening 18. Although FIG. 3A shows four through openings 18 and four corresponding attachment elements 20, the housing 12 may have one, two, three, or more than four through openings 18 and corresponding attachment elements 20.

FIG. 3A shows the exterior 22 of the housing 12 with the opening 102 formed through the housing 12. The opening 102 (see FIG. 3A) is preferably of a sufficient size and configuration to have the optical sensor protective lens 122 (see FIG. 3A), such as in the form of the manually operated optical sensor protective lens 122a (see FIG. 3A), inserted through the opening 102 (see FIG. 3A) and positioned at a location 96 (see FIG. 3A) on the exterior 22 (see FIG. 3A) of the housing 12 (see FIG. 3A).

As further shown in FIG. 3A, one or more tactile switch openings 104, such as in the form of first tactile switch opening 104a and second tactile switch opening 104b, may be formed through the first portion 12a of the housing 12. FIG. 3A further shows tactile switches 98, such as first tactile switch 98a and second tactile switch 98b. FIG. 3A shows the first tactile switch 98a inserted through the first tactile switch opening 104a, and shows the second tactile switch 98b inserted through the second tactile switch opening 104b.

As shown in FIG. 3A, the measurement apparatus 10, such as in the form of measurement apparatus 10c, further comprises the pair of support legs 30 depending from the housing 12. The support legs 30 (see FIG. 3A) comprise the first support leg 30a (see FIG. 3A) and the second support leg 30b (see FIG. 3A). As shown in FIG. 3A, each support leg 30 has the first end 32a and the second end 32b, and has the support leg structure 36 being a single support leg structure, for example, a rectangular block portion. The support leg structure 36 (see FIG. 3A) may also comprise another suitable structure of one, two, or more portions.

As further shown in FIG. 3A, each support leg 30 has the outer side 38a, the inner side 38b, the front side 39a, and the support leg opening 40 formed in the outer side 38a. Instead of having the stop element 42 (see FIGS. 1A, 2A) as shown in the measurement apparatus 10 (see FIG. 1A), such as in the form of measurement apparatus 10a (see FIG. 1A) and the measurement apparatus 10 (see FIG. 2A), such as in the form of measurement apparatus 10b (see FIG. 2A), the measurement apparatus 10 (see FIG. 3A), such as in the form of measurement apparatus 10c (see FIG. 3A), includes domed surface elements 132 (see FIGS. 3B, 3D) on the first ends 32a (see FIGS. 3B, 3D) of the support legs 30 (see FIGS. 3B, 3D), that function to stop or limit the displacement 144 (see FIG. 4) of the slide rail 56 (see FIGS. 3B, 3D) of each support leg 30 (see FIGS. 3B, 3D) sliding along the corresponding slide groove 57 (see FIGS. 3B, 3D, 3E) formed in each of the pair of conductive measurement probes 44 (see FIGS. 3B, 3D, 3E). The domed surface elements 132 (see FIGS. 3B-3D) are discussed in further detail with respect to FIGS. 3B-3D.

As shown in FIG. 3A, the measurement apparatus 10, such as in the form of measurement apparatus 10c, further comprises the pair of conductive measurement probes 44, such as in the form of the first conductive measurement probe 44a and the second conductive measurement probe 44b, both slidably disposed between the inner sides 38b of the support legs 30. FIG. 3A shows the first contact end 46a, the extending portion 47, the probe body 50, the front side 52a, the outer side 54a, the inner side 54b, and one or more probe openings 58.

As shown in FIG. 3A, the measurement apparatus 10, such as in the form of measurement apparatus 10c, may further comprise the center structural portion 60, such as in the form of the center block 60a, coupled between the inner sides 54b of the conductive measurement probes 44. FIG. 3A shows the first end 62a, the second end 62b, and the front side 64a of the center structural portion 60, such as in the form of center block 60a.

This version of the measurement apparatus 10, such as in the form of measurement apparatus 10c, may be wireless and may have wireless capability 101 (see FIG. 4), and may have the internal housing assembly 100, such as in the form of the wireless assembly 100a, similar to that shown in FIG. 2B. For example, the measurement apparatus 10, such as in the form of measurement apparatus 10c, may comprise the circuit board 106 (see FIG. 2B), such as the manually operated circuit board 106a (see FIG. 2B); the optical sensor 108 (see FIG. 2B), such as the manually operated optical sensor 108a (see FIG. 2B); the cover plate 110 (see FIG. 2B) for the optical sensor 108 (see FIG. 2B); the power source 116 (see FIG. 2B), such as the battery 116a (see FIG. 2B) or other suitable power source; the one or more tactile switch retainers 118 (see FIG. 2B), such as in the form of first tactile switch retainer 118a (see FIG. 2B) and second tactile switch retainer 118b (see FIG. 2B); the optical sensor lens 120 (see FIG. 2B), such as in the form of manually operated optical sensor lens 120a (see FIG. 2B); the optical sensor protective lens 122 (see FIG. 3A), such as in the form of the manually operated optical sensor protective lens 122a (see FIG. 3A); and the wireless adapter element 124 (see FIG. 2B), such as in the form of a universal serial bus (USB) wireless adapter 124a (see FIG. 2B). The wireless assembly 100a (see FIG. 2B) for measurement apparatus 10, such as measurement apparatus 10c, may be used with an optical mouse 125 (see FIG. 4), such as in the form of a wireless infrared (IR) optical mouse 125a (see FIG. 4).

Now referring to FIGS. 3B-3C, FIG. 3B is an illustration of a front view of the measurement apparatus 10, such as in the form of measurement apparatus 10c, of FIG. 3A, in a non-measurement position 80a, and FIG. 3C is an illustration of a front view of the measurement apparatus 10, such as in the form of measurement apparatus 10c, of FIG. 3B, in a measurement position 80b.

FIGS. 3B-3C show the measurement apparatus 10, such as in the form of measurement apparatus 10c, comprising the first portion 12a and the second portion 12b of the housing 12. FIGS. 3B-3C show the front end 28a of the housing 12 having the opening 102 surrounding the optical sensor protective lens 122, such as in the form of manually operated optical sensor protective lens 122a, and shows the top end 14a and the bottom end 14b of the housing 12. FIGS. 3B-3C further show the tactile switches 98, such as first tactile switch 98a and second tactile switch 98b.

FIGS. 3B-3C further show the pair of support legs 30 comprising the first support leg 30a and the second support leg 30b, where each support leg 30 has the first end 32a, the second end 32b, the support leg structure 36, the outer side 38a, the inner side 38b, the front side 39a, and the slide rails 56 formed longitudinally along the inner side 38b of each support leg 30, where the first support leg 30a has the first slide rail 56a and the second support leg 30b has the second slide rail 56b.

Figure 3D:
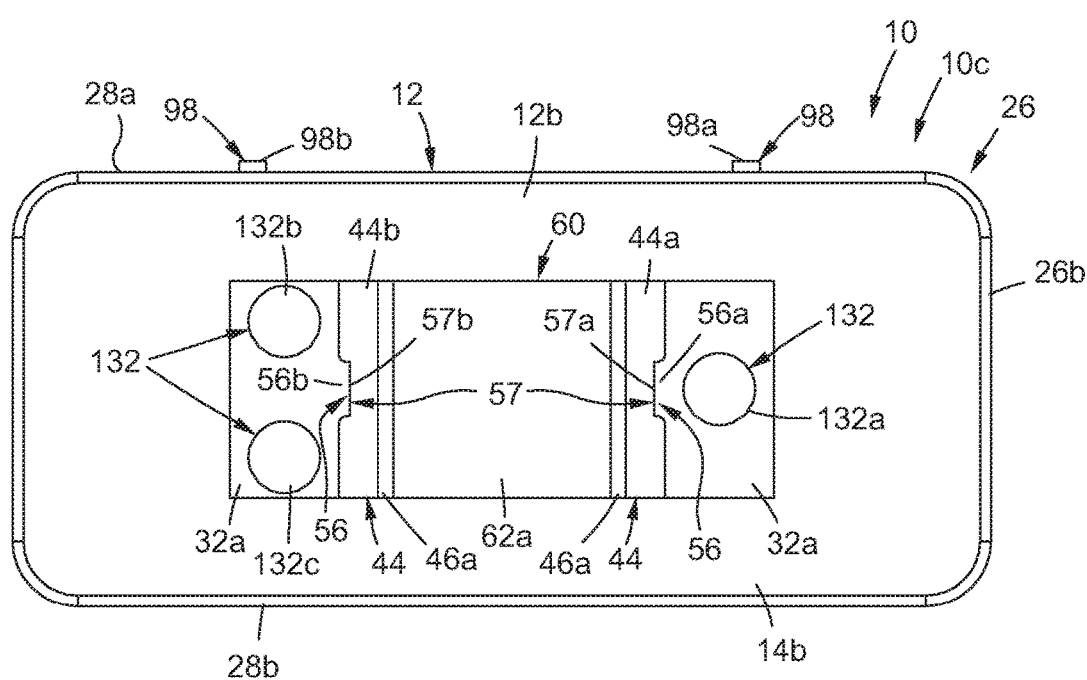
FIG. 3D is an illustration of a bottom view of the measurement apparatus of FIG. 3A.

As shown in FIGS. 3B-3C, in this version of the measurement apparatus 10c, the first ends 32a of the support legs 30 include domed surface elements 132, such as in the form of a first domed surface element 132a, a second domed surface element 132b, and a third domed surface element 132c (see FIG. 3D). The contact surfaces of the domed surface elements 132 define a domed surface plane 133 (see FIG. 3B).

FIGS. 3B-3C further show the pair of conductive measurement probes 44, such as in the form of first conductive measurement probe 44a and second conductive measurement probe 44b, both slidably disposed between the inner sides 38b of the support legs 30. As shown in FIGS. 3B-3C, the conductive measurement probes 44 each have the first contact end 46a, the second end 46b, the extending portion 47, the front side 52a, the outer side 54a, the inner side 54b, and one or more probe openings 58. As further shown in FIG. 3B, each conductive measurement probe 44 has the slide groove 57, where the first conductive measurement probe 44a has the first slide groove 57a and the second conductive measurement probe 44b has the second slide groove 57b.

FIGS. 3B-3C further show the center structural portion 60, such as in the form of the center block 60a, coupled between the pair of conductive measurement probes 44, such as the first conductive measurement probe 44a and second conductive measurement probe 44b. FIGS. 3B-3C show the first end 62a, the second end 62b, and the front side 64a of the center structural portion 60, such as in the form of the center block 60a.

FIGS. 3B-3C further show the force applying members 74, such as in the form of springs 74a. However, the force applying member 74 (see FIG. 1C) may also comprise a leaf spring, a hydraulic device, an air bag, an electromagnetic device, or any type of suitable mechanical system that allows application of a set or consistent pressure.

FIGS. 3B-3C show the force applying members 74, such as in the form of springs 74a, coupled between the second end 62b of the center structural portion 60 and the bottom end 14b of the housing 12. Alternatively, if the measurement apparatus 10 does not have a center structural portion 60 (see FIG. 3B), the force applying member 74, such as in the form of spring 74a, may be coupled between the second ends 46b (see FIG. 3B) of the conductive measurement probes 44 (see FIG. 3B), and the bottom end 14b (see FIG. 3B) of the housing 12 (see FIG. 3B).

FIG. 3B shows the force applying members 74, such as in the form of springs 74a, in the extended position 78a, when the measurement apparatus 10 is in the non-measurement position 80a. FIG. 3C shows the force applying members 74, such as in the form of springs 74a, in the compressed position 78b, when the measurement apparatus 10 is in the measurement position 80b.

The force applying members 74 (see FIG. 3B), such as in the form of springs 74a (see FIG. 3B), apply the biasing force 77 (see FIG. 4) to cause the pair of conductive measurement probes 44 (see FIG. 3B) to extend a predetermined distance 82 (see FIG. 3B) beyond the first ends 32a (see FIG. 3B) of the support legs 30 (see FIG. 3B) and beyond the domed surface plane 133 (see FIG. 3B). Each of the conductive measurement probes 44 (see FIG. 3B) preferably extends the predetermined distance 82 (see FIG. 3B) of at least 0.25 inches beyond the domed surface plane 133 (see FIG. 3B), when the measurement apparatus 10 (see FIG. 3B) is in the non-measurement position 80a (see FIG. 3B).

As shown in FIG. 3C, in the measurement position 80b, the first contact end 46a of each conductive measurement probe 44 and the contact surfaces of the domed surface elements 132 of each support leg 30, of the measurement apparatus 10, are in contact with a surface 84 of a structure 86. The surface 84 (see FIG. 3C) may comprise a contoured surface 84b (see FIG. 3C), or another suitable surface. The structure 86 (see FIG. 3C) may comprise an aircraft part 86a (see FIG. 3C), an aircraft assembly 86b (see FIG. 4), a radome 86c (see FIG. 4), or another suitable structure 86 to be measured or tested for conductivity 138 (see FIG. 4) or surface resistivity 136 (see FIG. 4).

The predetermined distance 82 (see FIG. 3B) in FIG. 3B of the pair of conductive measurement probes 44 (see FIG. 3B) extending beyond the first ends 32a (see FIG. 3B) of the support legs 30 (see FIG. 3B) and beyond the domed surface plane 133 (see FIG. 3B), is shown moved upwardly in FIG. 2D, so that the bottom of the predetermined distance 82 (see FIG. 3B) is aligned with the contact surfaces of the domed surface elements 132 (see FIG. 3C) and the surface 84 (see FIG. 3C).

As shown in FIG. 3C, the downward applied force 146 applied to the top end 14a of the housing 12, when the first contact ends 46a of the conductive measurement probes 44 are in contact with the surface 84, causes a displacement 144 (see FIG. 4) of the conductive measurement probes 44, until the contact surfaces of the domed surface elements 132 of the support legs 30 defining the domed surface plane 133 (see FIG. 3B) contact the surface 84, such that compression of the force applying members 74 by the displacement 144 (see FIG. 4) provides a predetermined probe contact force 149 against the surface 84, that is independent of the downward applied force 146. As a result, conductivity measurements 140 (see FIG. 4) between the conductive measurement probes 44 (see FIG. 3C) are consistently obtained from measurement to measurement to thereby improve conductivity measurement accuracy 142 (see FIG. 4). The displacement 144 (see FIG. 4) of the conductive measurement probes 44 (see FIG. 3C), until the contact surfaces of the domed surface elements 132 (see FIG. 3C) of the support legs 30 (see FIG. 3C) contact the surface 84 (see FIG. 3C), compresses the force applying members 74 (see FIG. 3C) by a displacement distance 144a (see FIG. 4) of at least 0.25 inches to provide the predetermined probe contact force 149 (see FIG. 3C) against the surface 84 (see FIG. 3C) of at least 0.5 pounds.

The design of the measurement apparatus 10 (see FIG. 3C) provides a consistent application 148 (see FIG. 4) of the downward applied force 146 (see FIG. 3C) or pressure on the surface 84 (see FIG. 3C), as the downward applied force 146 (see FIG. 3C) or pressure may be controlled through the force applying elements 74 (see FIG. 3C), such as the springs 74a (see FIG. 3C), that maintain a set psi (pounds per square inch) via the springs 74a and the domed surface elements 132 (see FIG. 3C). The domed surface elements 132 (see FIG. 3C) control a surface area angularity 152 (see FIG. 4) between the first contact ends 46a (see FIG. 3C) of the conductive measurement probes 44 (see FIG. 3C) and the surface 84. By controlling the surface area angularity 152 (see FIG. 4) between the first contact ends 46a (see FIG. 3C) of the conductive measurement probes 44 (see FIG. 3C), and by controlling the psi, the operator or user may accurately measure the conductivity 138 (see FIG. 4) or surface resistivity 136 (see FIG. 4) between the first contact ends 46a, regardless of which operator or user is performing the testing, inspection, or work.

Now referring to FIG. 3D, FIG. 3D is an illustration of a bottom view of the measurement apparatus 10, such as in the form of measurement apparatus 10c, of FIG. 3A. FIG. 3D shows the bottom end 14b of the second portion 12b of the housing 12 and shows the front end 28a of the housing 12, the back end 28b of the housing 12, and the tactile switches 98, such as the first tactile switch 98a and the second tactile switch 98b, coupled to the housing 12. In this version, the housing 12 (see FIG. 3D) has a housing cross-section configuration 26 (see FIG. 2G), such as in the form of the rectangular cross-section configuration 26b. Alternatively, the housing cross-section configuration 26 may comprise another shape or configuration.

The first ends 32a (see FIG. 3D) of the support legs 30 (see FIG. 3A) comprise the domed surface elements 132, such as the first domed surface element 132a on one first end 32a (see FIG. 3D), and the second domed surface element 132b and the third domed surface element 132c on the other first end 32a. In this version, there are three domed surface elements 132. However, the first ends 32a may have more than three total domed surface elements 132. FIG. 3D further shows the slide rails 56, such as the first slide rail 56a and the second slide rail 56b, of the support legs 30 (see FIG. 3A), and shows the slide grooves 57, such as the first slide groove 57a and the second slide groove 57b of the conductive measurement probes 44. FIG. 3D further shows the first contact ends 46a of the conductive measurement probes 44, such as the first conductive measurement probe 44a and the second conductive measurement probe 44b, and further shows the first end 62a of the center structural portion 60.

Figure 3E:
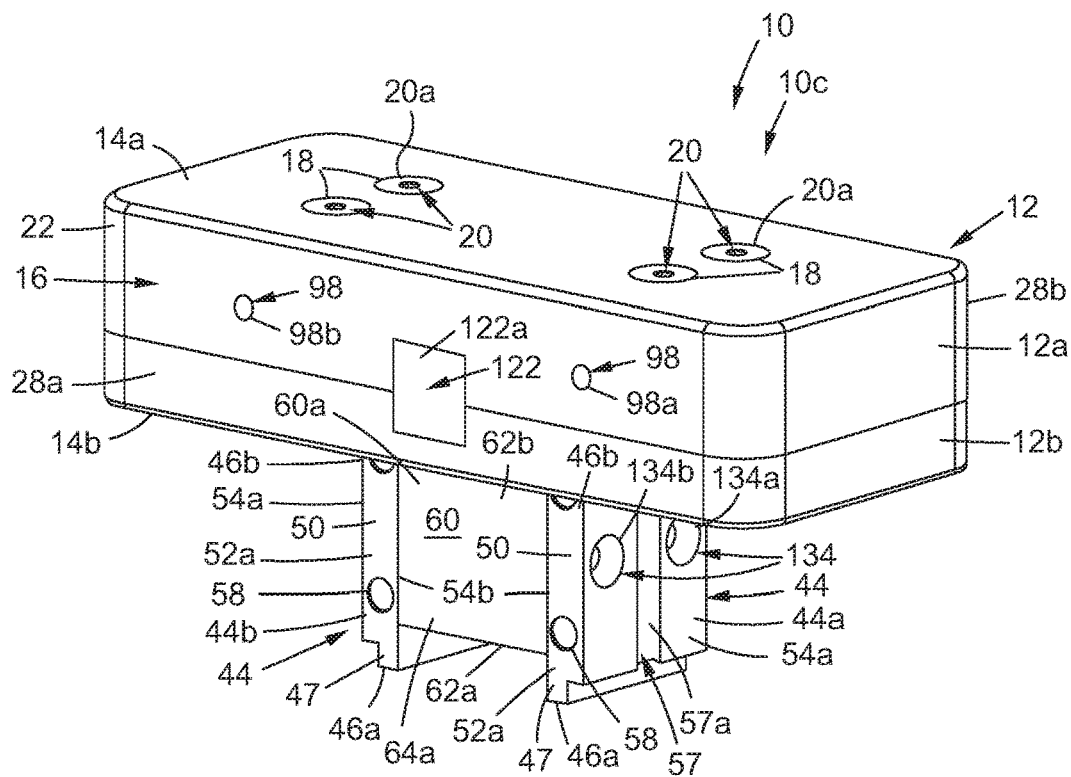
FIG. 3E is an illustration of a front perspective view of the measurement apparatus of FIG. 3A, without the pair of support legs.
Figure 3F:
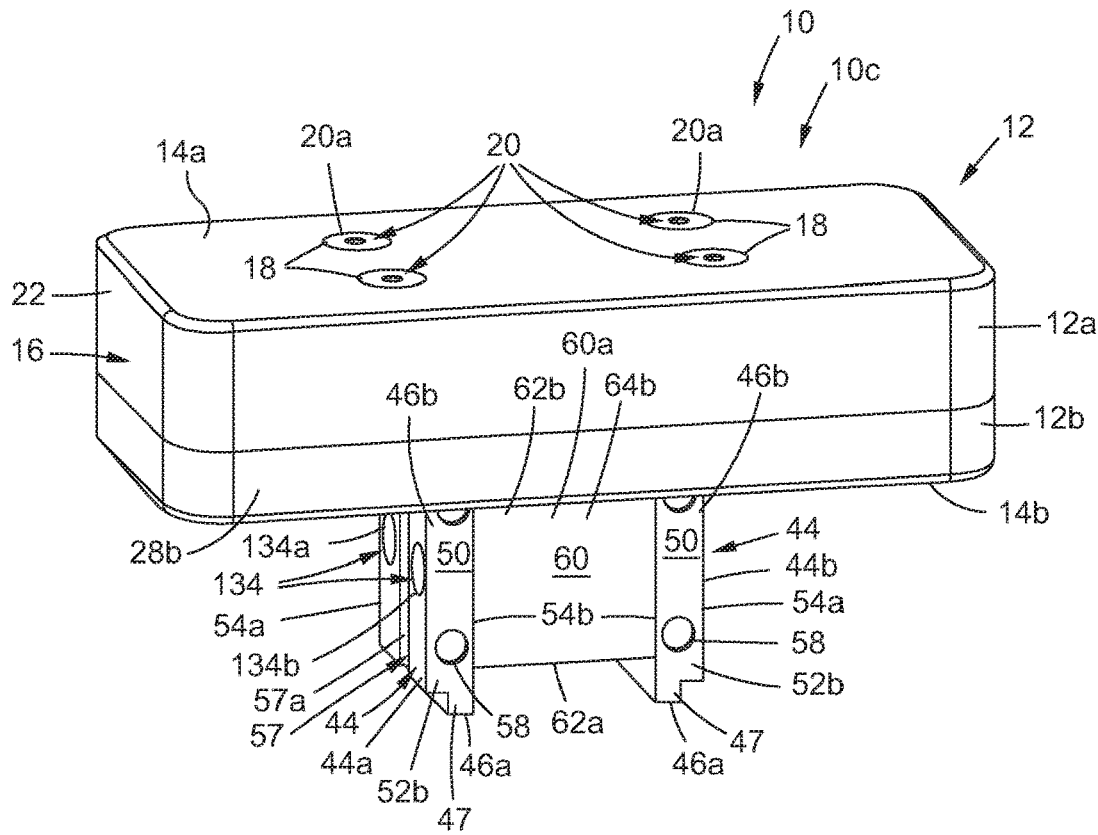
FIG. 3F is an illustration of a back perspective view of the measurement apparatus of FIG. 3E, without the pair of support legs.

Now referring to FIGS. 3E-3F, FIG. 3E is an illustration of a front perspective view of the measurement apparatus 10, such as in the form of measurement apparatus 10c, of FIG. 3A, without the pair of support legs 30 (see FIG. 3A), and FIG. 3F is an illustration of a back perspective view of the measurement apparatus 10, such as in the form of measurement apparatus 10c, of FIG. 3E, without the pair of support legs 30 (see FIG. 3A).

As shown in FIGS. 3E-3F, the measurement apparatus 10, such as in the form of measurement apparatus 10c, comprises the housing 12 having the first portion 12a, the second portion 12b, the top end 14a, the bottom end, the body 16 formed in between the top end 14a and the bottom end 14b, the exterior 22, the front end 28a (see FIG. 3E), and the back end 28b.

FIGS. 3E-3F further show the through openings 18 and attachment elements 20, such as in the form of a bolts 20a, inserted through each respective through opening 18. FIG. 3E shows the optical sensor protective lens 122, such as in the form of the manually operated optical sensor protective lens 122a, and the tactile switches 98, such as first tactile switch 98a and second tactile switch 98b, on the exterior 22 of the housing 12.

FIGS. 3E-3F further show the pair of conductive measurement probes 44, such as in the form of first conductive measurement probe 44a and second conductive measurement probe 44b, each having the first contact end 46a, the second end 46b, the extending portion 47, the probe body 50, the front side 52a (see FIG. 3E), the back side 52b (see FIG. 3F), the outer side 54a, the inner side 54b, and one or more probe openings 58. As shown in FIGS. 3E-3F, each of the conductive measurement probes 44, such as in the form of first conductive measurement probe 44a and second conductive measurement probe 44b, has the slide groove 57 longitudinally formed in the outer side 54a. FIGS. 3E-3F show the slide groove 57, such as the first slide groove 57a. FIGS. 3E-3F further show one or more side openings 134, such as in the form of a first side opening 134a and a second side opening 134b, formed through the probe body 50 of each conductive measurement probe 44. The side openings 134 (see FIGS. 3E-3F) may be formed on each side of the slide groove 57 (see FIGS. 3E-3F), and attachment elements may be inserted through the one or more side openings 134 (see FIGS. 3E-3F) to connect the conductive measurement probes 44 to the support legs 30 (see FIG. 3A) and/or to the center structural portion 60, such as the center block 60a.

FIGS. 3E-3F further show the first end 62a, the second end 62b, the front side 64a (see FIG. 3E), and the back side 64b (see FIG. 3F), of the center structural portion 60, such as in the form of center block 60a. The center structural portion 60 (see FIGS. 3E-3F), such as in the form of the center block 60a (see FIGS. 3E-3F), is coupled between the inner sides 54b (see FIGS. 3E-3F) of the conductive measurement probes 44 (see FIGS. 3E-3F).

Now referring to FIG. 4, FIG. 4 is an illustration of a functional block diagram of exemplary versions of a measurement system 150 comprising a version of the measurement apparatus 10, such as in the form of measurement apparatus 10a, measurement apparatus 10b, and measurement apparatus 10c, of the disclosure. FIG. 4 shows the measurement system 150 for obtaining conductivity measurements 140 of the surface 84 of a structure 86. The measurement apparatus 10 (see FIG. 4) of the measurement system 150 (see FIG. 4) may comprise a set increment measurement apparatus 11a, such as for use on a flat surface 84a (see FIG. 4), or may comprise a variable increment measurement apparatus 11b, such as for use on a contoured surface 84b (see FIG. 4). Preferably, the measurement apparatus 10 (see FIG. 4) is a direct current (DC) measurement apparatus 11c (see FIG. 4).

As shown in FIG. 4, the measurement apparatus 10 of the measurement system 150 comprises the housing 12 and the pair of support legs 30 depending from the housing 12. Each support leg 30 (see FIG. 4) has the first end 32a (see FIG. 4), wherein the first ends 32a define a support leg plane 34 (see FIG. 4). Each support leg 30 (see FIG. 4) further has a slide rail 56 (see FIG. 4) formed along an inner side 38b (see FIGS. 1C, 1E) of each support leg 30.

In the versions of the measurement apparatus 10, such as measurement apparatus 10a (see FIG. 1A) and measurement apparatus 10b (see FIG. 2B), as discussed above with respect to FIGS. 1A and 2B, the measurement apparatus 10 (see FIG. 4) may further comprise a stop element 42 (see FIGS. 1A, 2B, 4) coupled within each support leg 30 (see FIGS. 1A, 2B, 4). The stop element 42 (see FIG. 4) is configured to limit the displacement 144 (see FIG. 4) of the slide rail 56 (see FIG. 4) of each support leg 30 (see FIG. 4) along the corresponding slide groove 57 (see FIG. 4) in each conductive measurement probe 44 (see FIG. 4).

In another version of the measurement apparatus 10, such as measurement apparatus 10c (see FIGS. 3B, 3D), as discussed above with respect to FIGS. 3B and 3D, the first ends 32a of the support legs 30 of the measurement apparatus 10 may include three domed surface elements 132 (see FIGS. 3B, 3D), such as the first domed surface element 132a (see FIGS. 3B, 3D), the second domed surface element 132b (see FIGS. 3B, 3D), and the third domed surface element 132c (see FIG. 3D), defining a domed surface plane 133 (see FIG. 3B). The downward applied force 146 (see FIG. 3C) applied to the housing 12 (see FIG. 3C), when the conductive measurement probes 44 (see FIG. 3C) are in contact with the surface 84 (see FIG. 3C), causes the displacement 144 (see FIG. 4) of the conductive measurement probes 44 (see FIG. 3C), until the three domed surface elements 132 (see FIG. 3C) defining the domed surface plane 133 (see FIG. 3B) contact the surface 84 (see FIG. 3C).

The measurement apparatus 10 (see FIG. 4) further comprises the pair of conductive measurement probes 44 (see FIG. 4) slidably disposed between the support legs 30 (see FIG. 4). Each conductive measurement probe 44 (see FIG. 4) has an extending portion 47, and a slide groove 57 (see FIG. 4) formed in an outer side 54a (see FIGS. 1E, 2C, 3E) of each conductive measurement probe 44 (see FIG. 4), wherein each slide rail 56 (see FIG. 4) is configured to slide along each corresponding slide groove 57 (see FIG. 4). As shown in FIG. 4, the pair of conductive measurement probes 44 each have a first contact end 26a, where the first contact ends 46a define a probe plane 48.

The measurement apparatus 10 (see FIG. 4) further comprises at least one force applying element 74 (see FIG. 4), such as in the form of spring 74a (see FIG. 4), coupled to the housing 12. However, the force applying member 74 (see FIG. 1C) may also comprise a leaf spring, a hydraulic device, an air bag, an electromagnetic device, or any type of suitable mechanical system that allows application of a set or consistent pressure.

In one version, the at least one force applying element 74 (see FIG. 4), such as spring 74a (see FIG. 4), applies a biasing force 77 (see FIG. 4) to cause the pair of conductive measurement probes 44 (see FIG. 4) to extend a predetermined distance 82 (see FIG. 4) beyond the support leg plane 34 (see FIGS. 1C, 2C), when the measurement apparatus 10 is in a non-measurement position 80a (see FIG. 4).

In another version, the at least one force applying element 74 (see FIG. 4), such as spring 74a (see FIG. 4), applies a biasing force 77 (see FIG. 4) to cause the pair of conductive measurement probes 44 (see FIG. 4) to extend a predetermined distance 82 (see FIG. 4) beyond the domed surface plane 133 (see FIG. 3B), when the measurement apparatus 10 is in the non-measurement position 80a (see FIG. 4).

In the versions of the measurement apparatus 10 shown in FIGS. 1D and 2D, a downward applied force 146 (see also FIG. 4) applied to the housing 12 (see also FIG. 4), when the conductive measurement probes 44 (see also FIG. 4) are in contact with the surface 84 (see also FIG. 4), causes a displacement 144 (see FIG. 4) of the conductive measurement probes 44, until the first ends 32a (see also FIG. 4) of the support legs 30 (see FIG. 4) contact the surface 84 (see FIG. 4), such that compression of the at least one spring 74a (see also FIG. 4) by the displacement 144 provides a predetermined probe contact force 149 (see also FIG. 4) against the surface 84, that is independent of the downward applied force 146, when the measurement apparatus 10 is in the measurement position 80b (see FIG. 4). The conductivity measurements 140 (see FIG. 4) between the conductive measurement probes 44 (see FIG. 4) are consistently obtained from measurement to measurement to thereby improve conductivity measurement accuracy 142 (see FIG. 4).

In another version of the measurement apparatus 10 shown in FIG. 3C, a downward applied force 146 (see also FIG. 4) applied to the housing 12 (see also FIG. 4), when the conductive measurement probes 44 (see also FIG. 4) are in contact with the surface 84 (see also FIG. 4), causes a displacement 144 (see FIG. 4) of the conductive measurement probes 44, until the contact surfaces of the domed surface elements 132 (see also FIG. 4) of the support legs 30 (see FIG. 4) contact the surface 84 (see also FIG. 4), such that compression of the at least one spring 74a (see also FIG. 4) by the displacement 144 provides a predetermined probe contact force 149 (see also FIG. 4) against the surface 84, that is independent of the downward applied force 146. The conductivity measurements 140 (see FIG. 4) between the conductive measurement probes 44 (see FIG. 4) are consistently obtained from measurement to measurement to thereby improve conductivity measurement accuracy 142 (see FIG. 4).

As shown in FIG. 4, the measurement apparatus 10 of the measurement system 150 may be used to test or measure the surface 84 of a structure 86 on a vehicle 200, such as an aircraft 200a. As further shown in FIG. 4, the structure 86 may comprise an aircraft part 86a, an aircraft assembly 86b, a radome 86c, or another suitable structure 86. For example, the measurement apparatus 10 (see FIG. 4) may be used to test or check conductivity 138 (see FIG. 4) or surface resistivity 136 (see FIG. 4) in radomes 86c (see FIG. 4), around aircraft doors 206 (see FIG. 6) for lightning protection, on lightning decals or appliques applied to structures 86 (see FIG. 4), such as aircraft parts 86a (see FIG. 4), of an aircraft 200a (see FIG. 4), or on other structures 84.

As further shown in FIG. 4, the measurement apparatus 10 of the measurement system 150 may be used on a surface 84 comprising a flat surface 84a, a contoured surface 84b, or another suitable surface. The surface 84 (see FIG. 4) preferably comprises a test surface 84c (see FIG. 4). The first contact ends 46a (see FIGS. 3C, 4) of the conductive measurement probes 44 (see FIGS. 3C, 4) may be removable and shaped for use on contoured surfaces 84b (see FIGS. 3C, 4). In the measurement position 80b (see FIG. 4), the first contact end 46a (see FIG. 4) of each conductive measurement probe 44 (see FIG. 4) and the contact surfaces of the domed surface elements 132 (see FIG. 4) of each support leg 30 (see FIG. 4), of the measurement apparatus 10 (see FIG. 4), are in contact with the surface 84 (see FIG. 4) of the structure 86 (see FIG. 4).

The design of the measurement apparatus 10 (see FIG. 4) provides a consistent application 148 (see FIG. 4) of the downward applied force 146 (see FIG. 4) or pressure on the surface 84 (see FIG. 4), as the downward applied force 146 (see FIG. 4) or pressure may be controlled through the force applying elements 74 (see FIG. 4), such as the springs 74a (see FIG. 4), that maintain a set psi (pounds per square inch) via the springs 74a and the stop element 42 (see FIG. 4) or the domed surface elements 132 (see FIG. 4). The stop element 42 (see FIG. 4) and the domed surface elements 132 (see FIG. 4) control a surface area angularity 152 (see FIG. 4) between the first contact ends 46a (see FIGS. 3C, 4) of the conductive measurement probes 44 (see FIGS. 3C, 4) and the surface 84. By controlling the surface area angularity 152 (see FIG. 4) between the first contact ends 46a (see FIGS. 3C, 4) of the conductive measurement probes 44 (see FIGS. 3C, 4), and by controlling the psi, the operator or user may accurately measure the conductivity 138 (see FIG. 4) or surface resistivity 136 (see FIG. 4) between the first contact ends 46a, regardless of which operator or user is performing the testing, inspection, or work. The measurement apparatus 10 (see FIG. 4) combines applying the consistent application 148 (see FIG. 4) of the downward applied force 146 (see FIG. 4) or pressure, and maintaining a consistent surface area 154 (see FIG. 4) in contact, with the ability to visually align the measurement apparatus 10 (see FIG. 4) far more accurately via the integral light emitting elements 88 (see FIG. 4).

As shown in FIG. 4, the measurement apparatus 10 may further comprise a center structural portion 60 coupled between the conductive measurement probes 44. The center structural portion 60 (see FIGS. 1I, 4) may house one or more light emitting elements 88 (see FIGS. 1I, 4), such as a first light emitting diode (LED) 88a (see FIGS. 1I, 4) and a second light emitting diode (LED) 88b (see FIGS. 1I, 4), in electrical connection with at least one of the conductive measurement probes 44 (see FIGS. 1A, 4). The one or more light emitting elements 88 (see FIGS. 1I, 4) are configured to illuminate the surface 86 (see FIG. 4) directly under the measurement apparatus 10 (see FIG. 4), when a sufficient amount of the downward applied force 146 (see FIG. 4) is applied to the housing 12 (see FIG. 4), to cause the displacement 144 (see FIG. 4) of the conductive measurement probes 44, until the first ends 32a (see FIG. 4) of the support legs 30 (see FIG. 4) contact the surface 84 (see FIG. 4). By providing an illuminating aperture 87 (see FIG. 4) between the first contact ends 46a (see FIG. 1D) of the conductive measurement probes 44 (see FIG. 1D), an operator may have light amplification 155 (see FIG. 4) and enhanced visibility 156 (see FIG. 4) under and between the conductive measurement probes 44 (see FIG. 1D), to allow the operator to place the first contact ends 46a (see FIG. 1D) of the conductive measurement probes 44 (see FIG. 1D) accurately on the surface 84 (see FIG. 1D) of the aircraft part 86a (see FIG. 1D) or aircraft assembly 86b (see FIG. 4).

The measurement apparatus 10 (see FIGS. 1A, 4) may further comprise an alignment element 94 (see FIGS. 1K, 4), such as in the form of a laser 94a (see FIGS. 1K, 4), coupled to the center structural portion 60 (see FIGS. 1K, 4). The alignment element 94 (see FIGS. 1K, 4), such as in the form of a laser 94a (see FIGS. 1K, 4), preferably provides an improved visual alignment 157 (see FIG. 4), and is preferably configured to align the measurement apparatus 10 (see FIGS. 1A, 4) with the surface 84 (see FIGS. 1D, 4) of the structure 86 (see FIGS. 1D, 4) to be measured, when the measurement apparatus 10 conducts a scanning function 158 (see FIG. 4) and scans the surface 84 of the structure 86. By incorporating the alignment element 94 (see FIGS. 1K, 4), such as in the form of the laser 94a (see FIGS. 1K, 4), in the measurement apparatus 10 (see FIGS. 1A, 4), the improved visual alignment 157 (see FIG. 4) and the light amplification 155 (see FIG. 4), in conjunction with the direct current (DC) probe contact points or first contact ends 46a (see FIG. 1D) of the conductive measurement probes 44 (see FIG. 1D), it allows the operator to focus on the conductivity inspection with less or no concern regarding adequate alignment of the conductive measurement probes 44 (see FIG. 1D) during the conductivity inspection.

The measurement system 150 (see FIG. 4) may further comprise a meter 159 (see FIG. 4), such as an ohm meter, connected via one or more wires to the measurement apparatus 10 (see FIG. 4). The one or more wires of the meter 159 (see FIG. 4) may be inserted or plugged into one or more of the probe openings 58 (see FIGS. 1A, 2A, 3A), in the conductive measurement probes 44 (see FIGS. 1A, 2A, 3A, 4). Thus, the measurement apparatus 10 (see FIG. 4) is hardwired to the meter 159 (see FIG. 4), and the plug-in wires of the meter 159 (see FIG. 4) allow the meter 159 to be held or connected in a hands-free manner.

The measurement system 150 (see FIG. 4) may further have a wireless capability 101 (see FIG. 4), where the measurement apparatus 10 (see FIG. 4) further comprises a wireless adapter element 124 (see FIG. 2B), such as a USB wireless adapter 124a (see FIGS. 2B, 4); a USB port 128 (see FIGS. 2F, 4); a USB data storage device 131 (see FIG. 4); a circuit board 106 (see FIG. 2B), such as a manually operated circuit board 106a (see FIG. 2B); an optical sensor 108 (see FIG. 4); an optical sensor lens 120 (see FIG. 2B); an optical sensor protective lens 122 (see FIG. 2B); a power source 116 (see FIG. 2B); one or more tactile switches 98 (see FIG. 2B); and an optical mouse 125 (see FIG. 4), such as a wireless infrared (IR) optical mouse 125a (see FIG. 4).

As shown in FIG. 4, the measurement system 150 further comprises a computer system 160 coupled to the measurement apparatus 10. As further shown in FIG. 4, the computer system 160 comprises at least a computer 162. The computer system 160 (see FIG. 4) may be used to implement the at least one computer 162 (see FIG. 4). As shown in FIG. 4, the computer system 160 further comprises a processor device 163 for executing one or more computing functions 161 of the computer 162, a computer memory 164, an operating system 165, a computer software program 166 configured for use with the computer 162 and the processor device 164 and configured to perform data analysis 167 of data 168. The data 168 (see FIG. 4) may comprise conductivity measurements 140 (see FIG. 4), surface resistance measurements 137 (see FIG. 4), and/or direct current (DC) measurements 143 (see FIG. 4) obtained with the measurement apparatus 10 (see FIG. 4). As shown in FIG. 4, the computer system 160 further comprises a communication system 169. The computer system 160 (see FIG. 4) may be wirelessly connected to the measurement apparatus 10 (see FIG. 4), via the wireless optical mouse 125a (see FIG. 4), such as the wireless infrared (IR) optical mouse 125a (see FIG. 4).

The at least one computer 162 (see FIG. 4) of the computer system 160 (see FIG. 4) preferably collects the data 168 (see FIG. 4), such as conductivity measurements 140 (see FIG. 4) of conductivity 138 (see FIG. 4), or such as surface resistance measurements 137 of surface resistivity 136 (see FIG. 4), or such as direct current (DC) measurements 143 (see FIG. 4), of the surface 84 (see FIG. 4) of the structure 86 (see FIG. 4), all obtained with the measurement apparatus 10 (see FIG. 4) during the testing or measuring. Preferably, the data 168 (see FIG. 4) obtained from the measurement apparatus 10 (see FIG. 4) of the measurement system 150 (see FIG. 4) is used to test, inspect, certify, and/or qualify the conductivity 138 (see FIG. 4) or surface resistivity 136 (see FIG. 4) of the surface 84 (see FIG. 4) of the structure 86 (see FIG. 4), such as the aircraft part 86a (see FIG. 4), the aircraft assembly 86b (see FIG. 4), a radome 86c (see FIG. 4), or another suitable structure 86.

The at least one computer 162 (see FIG. 4) may be configured to control one or more computing functions 161 (see FIG. 4) of one or more elements of the computer system 160 (see FIG. 4) through computer program instructions, such as one or more computer software programs 166 (see FIG. 4) stored on the computer memory 164 (see FIG. 4), accessible to the computer 162 (see FIG. 4), or the processor device 163 (see FIG. 4). The computer software program 166 (see FIG. 4) may comprise an algorithm, a program code, computer software, computer firmware, or another suitable system logic. The computer software program 166 (see FIG. 4) may be loaded into the computer 162 (see FIG. 4), the processor device 163 (see FIG. 4), or other programmable device, to configure and direct the computer 162, the processor device 164, or other programmable device to execute operations to be performed on or by the computer 162, the processor device 163, or other programmable device, and to function in a particular way. The computer memory 164 (see FIG. 4) may comprise one or more of a random access memory (RAM), including dynamic and/or static RAM, on-chip or off-chip cache memory, or other suitable computer memory 164 (see FIG. 4).

The communication system 169 (see FIG. 4) of the computer system 160 (see FIG. 4) may comprise one or more computer communications devices, such as one or more network communications devices, for linking the measurement system 150 (see FIG. 4), for example, to one or more separate systems. The one or more network communications devices may comprise network links between various computers and devices connected together within a network data processing system via wire connections, wireless communication links, fiber optic cables, or other suitable network connections, and that may connect to a network, a server, the Internet, or another system or device.

Figure 5:
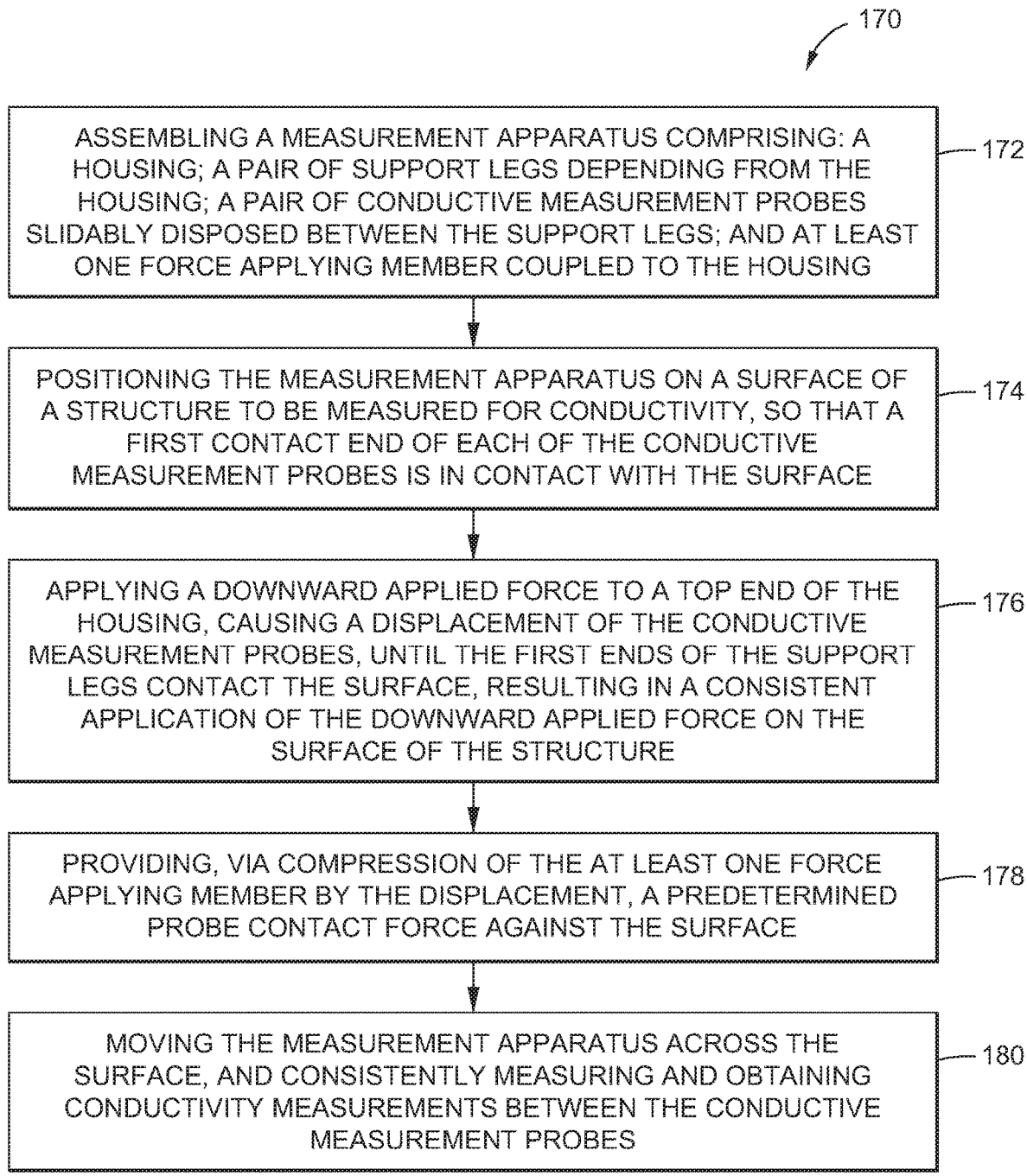
FIG. 5 is an illustration of a flow diagram showing an exemplary measurement method of the disclosure.

Now referring to FIG. 5, in another version there is provided a measurement method 170 for obtaining conductivity measurements 140 (see FIG. 4) of a surface 84 (see FIG. 4) of a structure 86 (see FIG. 4) to be measured for conductivity 138 (see FIG. 4). FIG. 5 is an illustration of a flow diagram showing the exemplary measurement method 170 of the disclosure.

As shown in FIG. 5, the method 170 comprises step 172 of assembling a measurement apparatus 10 (see FIG. 4). As discussed in detail above, the measurement apparatus 10 (see FIGS. 1A, 2A, 3A, 4) comprises a housing 12 (see FIGS. 1A, 2A, 3A, 4) and a pair of support legs 30 (see FIGS. 1A, 2A, 3A, 4) depending from the housing 12. Each support leg 30 (see FIGS. 1A, 2A, 3A, 4) has a first end 32a (see FIGS. 1A, 2A, 3A, 4), wherein the first ends 32a define a support leg plane 34 (see FIGS. 1C, 2C), or the domed surface elements 132 (see FIGS. 3B, 4) define a domed surface plane 133 (see FIG. 3B).

The measurement apparatus 10 (see FIGS. 1A, 2A, 3A, 4) further comprises a pair of conductive measurement probes 44 (see FIGS. 1A, 2A, 3A, 4) slidably disposed between the support legs 30 (see FIGS. 1A, 2A, 3A, 4). The measurement apparatus 10 (see FIGS. 1A, 2A, 3A, 4) further comprises at least one force applying member 74 (see FIGS. 1C, 2C, 3B, 4) coupled to the housing 12. The at least one force applying member 74 applies a biasing force 77 (see FIG. 4) to cause the pair of conductive measurement probes 44 to extend a predetermined distance 82 (see FIGS. 1C, 2C, 3B, 4) beyond the support leg plane 34 (see FIGS. 1C, 2C), or beyond the domed surface plane 133 (see FIG. 3B).

The step 172 (see FIG. 5) of assembling the measurement apparatus 10 (see FIGS. 1A, 2A, 3A, 4) may further comprise assembling 172 the measurement apparatus 10 comprising a center structural portion 60 (see FIGS. 1A, 2A, 3A, 4) coupled between the conductive measurement probes 44 (see FIGS. 1A, 2A, 3A, 4). The center structural portion 60 (see FIGS. 1I, 4) may house one or more light emitting elements 88 (see FIGS. 1I, 4), such as in the form of first light emitting diode (LED) 88a (see FIGS. 1I, 4) and second light emitting diode (LED) 88b (see FIGS. 1I, 4), in electrical connection with at least one of the conductive measurement probes 44. The one or more light emitting elements 88 (see FIGS. 1I, 4) illuminate the surface 86 (see FIG. 4) directly under the measurement apparatus 10 (see FIGS. 1D, 2D, 3C, 4), when a sufficient amount of the downward applied force 146 (see FIGS. 1D, 2D, 3C, 4) is applied to the housing 12, to cause the displacement 144 (see FIG. 4) of the conductive measurement probes 44, until the first ends 32a (see FIGS. 1D, 2D, 3C, 4) of the support legs 30 (see FIGS. 1D, 2D, 3C, 4) contact the surface 84 (see FIGS. 1D, 2D, 3C, 4).

The step 172 (see FIG. 5) of assembling the measurement apparatus 10 (see FIGS. 1A, 2A, 3A, 4) may further comprise assembling 172 the measurement apparatus 10 comprising, in one version, a stop element 42 (see FIGS. 1A, 2B, 4) coupled within each support leg 30 (see FIGS. 1A, 2B, 4). The stop element 42 (see FIGS. 1A, 2B, 4) limits the displacement 144 (see FIG. 4) of a slide rail 56 (see FIGS. 1E, 2C, 4) of each support leg 30 along a corresponding slide groove 57 (see FIGS. 1E, 2C, 4) in each conductive measurement probe 44. Each slide rail 56 (see FIGS. 1E, 2C, 4) is formed along an inner side 38b (see FIGS. 1E, 2C) of each support leg 30. Each corresponding slide groove 57 (see FIGS. 1E, 2C, 4) is formed in an outer side 54a (see FIGS. 1E, 2C) of each conductive measurement probe 44, such that the conductive measurement probes 44 are slidably disposed between the support legs 30.

The step 172 (see FIG. 5) of assembling the measurement apparatus 10 may further comprise assembling 172 the measurement apparatus 10 wherein the first ends 32a (see FIGS. 3C-3D, 4) of the support legs 30 (see FIGS. 3C-3D, 4) include three domed surface elements 132 (see FIGS. 3C-3D, 4), such as in the form of first domed surface element 132a (see FIGS. 3C-3D), second domed surface element 132b (see FIGS. 3C-3D), and third domed surface element 132c (see FIG. 3D). The three domed surface elements 132 (see FIGS. 3B, 4) define a domed surface plane 133 (see FIG. 3B). The step 176 (see FIG. 5) of applying the downward applied force 146 (see FIGS. 3C, 4) to the top end 14a (see FIG. 3C) of the housing 12 (see FIGS. 3C, 4), causes the displacement 144 (see FIG. 4) of the conductive measurement probes 44 (see FIGS. 3C, 4), until the three domed surface elements 132 (see FIGS. 3C, 4) defining the domed surface plane 133 (see FIG. 3B) contact the surface 84 (see FIG. 3C).

The stop element 42 (see FIG. 4) and the domed surface elements 132 (see FIG. 4) control the surface area angularity 152 (see FIG. 4) between the first contact ends 46a (see FIGS. 3C, 4) of the conductive measurement probes 44 (see FIGS. 3C, 4) and the surface 84. By controlling the surface area angularity 152 (see FIG. 4) between the first contact ends 46a (see FIGS. 3C, 4) of the conductive measurement probes 44 (see FIGS. 3C, 4), and by controlling the psi (pounds per square inch) of pressure, the operator or user may accurately measure the conductivity 138 (see FIG. 4) or surface resistivity 136 (see FIG. 4) between the first contact ends 46a, regardless of which operator or user is performing the testing, inspection, or work.

The step 172 (see FIG. 5) of assembling the measurement apparatus 10 may further comprise assembling 172 the measurement apparatus 10 to be wireless and comprising a wireless adapter element 124 (see FIG. 2B), a circuit board 106 (see FIG. 2B), an optical sensor 108 (see FIGS. 2B, 4), an optical sensor lens 120 (see FIG. 2B), an optical sensor protective lens 122 (see FIG. 2B), a power source 116 (see FIG. 2B), and one or more tactile switches 98 (see FIG. 2B). The measurement method 170 (see FIG. 5) may further comprise wirelessly connecting the measurement apparatus 10 (see FIG. 4) to a computer system 160 (see FIG. 4).

As shown in FIG. 5, the method 170 further comprises step 174 of positioning the measurement apparatus 10 (see FIGS. 1D, 2D, 3C, 4) on the surface 84 (see FIGS. 1D, 2D, 3C, 4) of the structure 86 (see FIGS. 1D, 2D, 3C, 4) to be measured for conductivity 138 (see FIG. 4), so that a first contact end 46a (see FIGS. 1D, 2D, 3C, 4) of each of the conductive measurement probes 44 (see FIGS. 1D, 2D, 3C, 4) is in contact with the surface 84.

As shown in FIG. 5, the method 170 further comprises step 176 of applying a downward applied force 146 (see FIGS. 1D, 2D, 3C, 4) to a top end 14a (see FIGS. 1D, 2D, 3C) of the housing 12 (see FIGS. 1D, 2D, 3C, 4), causing a displacement 144 (see FIG. 4) of the conductive measurement probes 44 (see FIGS. 1D, 2D, 3C, 4), until the first ends 32a (see FIGS. 1D, 2D, 3C, 4) of the support legs 30 (see FIGS. 1D, 2D, 3C, 4) contact the surface 84 (see FIGS. 1D, 2D, 3C, 4). This results in a consistent application 148 (see FIG. 4) of the downward applied force 146 (see FIGS. 1D, 2D, 3C, 4) on the surface 84 (see FIGS. 1D, 2D, 3C, 4) of the structure 86 (see FIGS. 1D, 2D, 3C, 4).

As shown in FIG. 5, the method 170 further comprises step 178 of providing, via compression of the at least one force applying member 74 (see FIGS. 1D, 2D, 3C, 4), such as in the form of springs 74a (see FIGS. 1D, 2D, 3C, 4), by the displacement 144 (see FIG. 4), a predetermined probe contact force 149 (see FIGS. 1D, 2D, 3C, 4) against the surface 84 (see FIGS. 1D, 2D, 3C, 4). The predetermined probe contact force 149 (see FIGS. 1D, 2D, 3C, 4) is preferably independent of the downward applied force 146 (see FIGS. 1D, 2D, 3C, 4).

As shown in FIG. 5, the method 170 further comprises step 180 of moving the measurement apparatus 10 (see FIGS. 1D, 2D, 3C, 4) across the surface 84 (see FIGS. 1D, 2D, 3C, 4), and consistently measuring and obtaining conductivity measurements 140 (see FIG. 4) or surface resistance measurements 137 (see FIG. 4) between the conductive measurement probes 44 (see FIGS. 1D, 2D, 3C, 4).

The measurement apparatus 10 (see FIG. 4) provides consistent application 148 (see FIG. 4) of the downward applied force 146 (see FIG. 4) or pressure on the surface 84 (see FIG. 4), as the downward applied force 146 (see FIG. 4) or pressure may be controlled through the force applying elements 74 (see FIG. 4), such as the springs 74a (see FIG. 4), that maintain a set psi (pounds per square inch) via the springs 74a and the stop element 42 (see FIG. 4), or the domed surface elements 132 (see FIG. 4). The measurement apparatus 10 (see FIG. 4) combines applying the consistent application 148 (see FIG. 4) of the downward applied force 146 (see FIG. 4) or pressure, and maintaining the consistent surface area 154 (see FIG. 4) in contact, with the ability to visually align the measurement apparatus 10 (see FIG. 4) far more accurately via the integral light emitting elements 88 (see FIG. 4).

Figure 6:
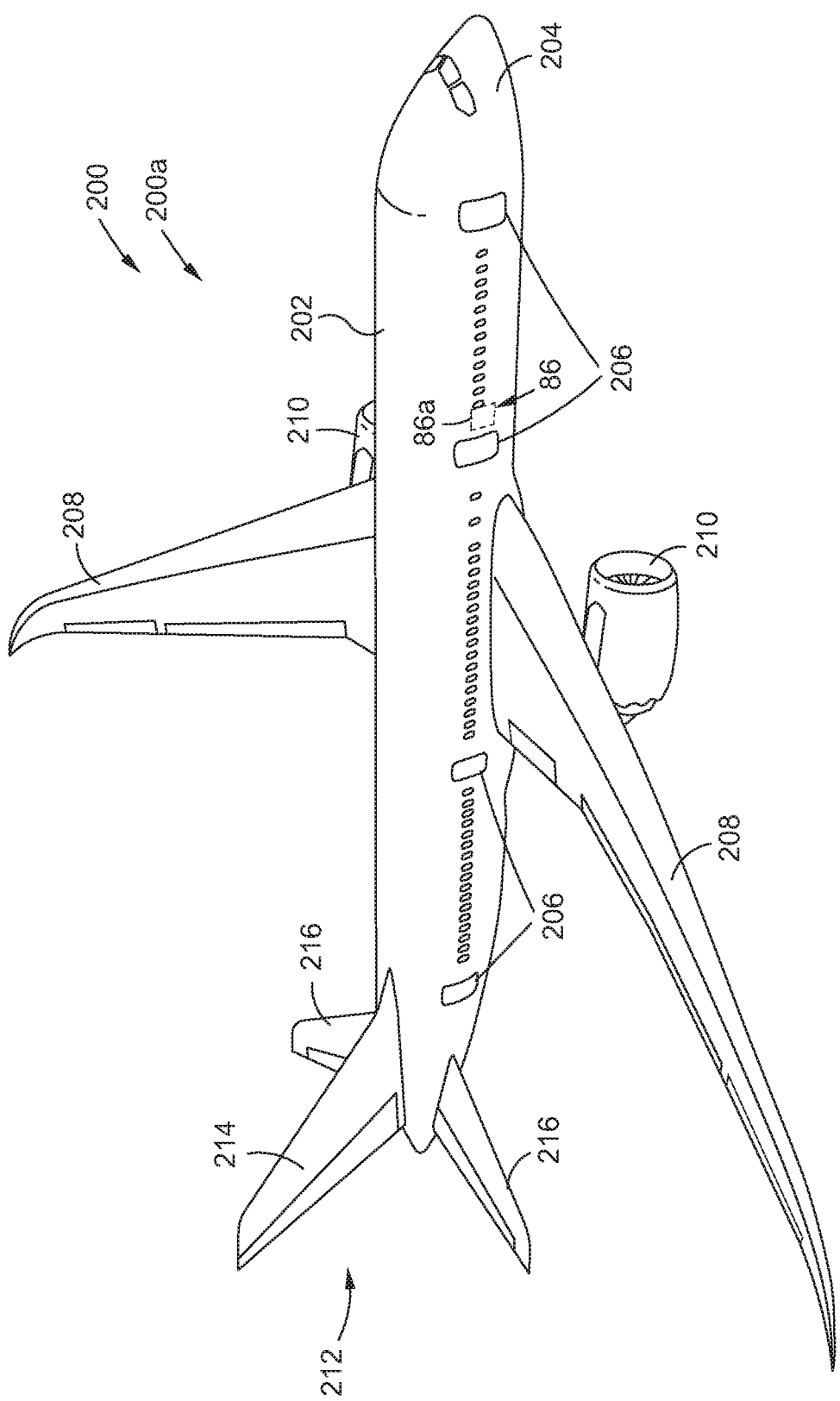
FIG. 6 is an illustration of a perspective view of a vehicle, such as an aircraft, that incorporates one or more structures that may be tested with versions of the measurement apparatus, the measurement system, and the measurement method of the disclosure.

Now referring to FIG. 6, FIG. 6 is an illustration of a perspective view of a vehicle 200, such as an aircraft 200a, that incorporates one or more structures 86, such as an aircraft part 86a, that may be tested with versions of the measurement apparatus 10 (see FIGS. 1A-3F), the measurement system 150 (see FIG. 4), and the measurement method 170 (see FIG. 5) of the disclosure.

As shown in FIG. 6, the vehicle 200, such as in the form of aircraft 200a, comprises a fuselage 202, a nose 204, a plurality of doors 206, wings 208, engines 210, and a tail 212 comprising a vertical stabilizer 214 and horizontal stabilizers 216. As further shown in FIG. 6, the vehicle 200, such as in the form of aircraft 200a, comprises one or more structures 86, such as one or more aircraft parts 86a for lightning protection, near or around one or more of the doors 206, that may be tested or measured with versions of the measurement apparatus 10 (see FIGS. 1A-3F), the measurement system 150 (see FIG. 4), and the measurement method 170 (see FIG. 5) of the disclosure.

Figure 7:
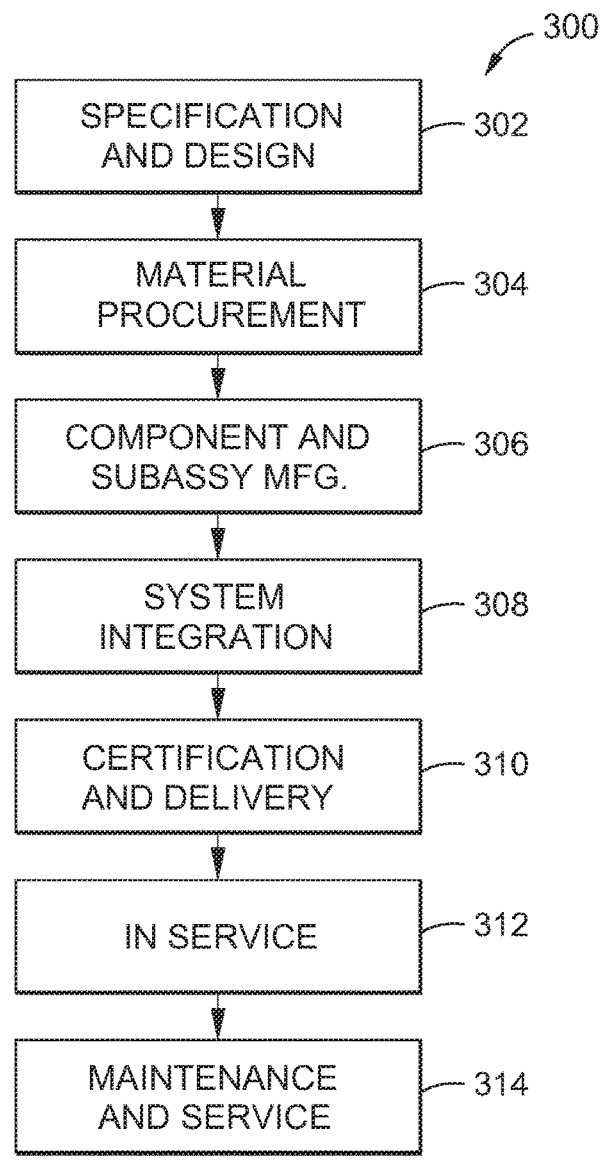
FIG. 7 is an illustration of a flow diagram of an aircraft manufacturing and service method.
Figure 8:
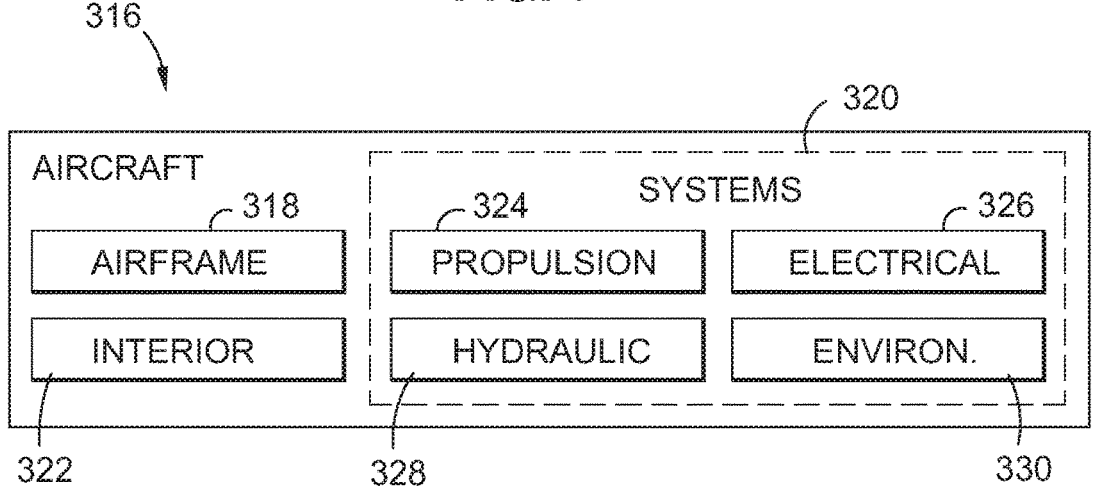
FIG. 8 is an illustration of a block diagram of an aircraft.

Now referring to FIGS. 7 and 8, FIG. 7 is an illustration of a flow diagram of an aircraft manufacturing and service method 300, and FIG. 8 is an illustration of a block diagram of an aircraft 316. Referring to FIGS. 7-8, versions of the disclosure may be described in the context of the aircraft manufacturing and service method 300 as shown in FIG. 7, and the aircraft 316 as shown in FIG. 8.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 8, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry, ship-building industry, and locomotive industry, among others.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus versions, method versions, or a combination thereof, may be utilized during component and subassembly manufacturing 306 and system integration 308, for example, by substantially expediting assembly of or reducing the cost of the aircraft 316. Similarly, one or more of apparatus versions, method versions, or a combination thereof, may be utilized while the aircraft 316 is in service 312, for example and without limitation, to maintenance and service 314.

Disclosed versions of the measurement apparatus 10 (see FIGS. 1A-3F), the measurement system 150 (see FIG. 4), and the measurement method 170 (see FIG. 5) combine the ability to control a consistent application 148 (see FIG. 4) of pressure and maintain a consistent surface area 154 (see FIG. 4) in contact, with the ability to visually align the measurement apparatus 10 far more accurately via integral light sources, such as light emitting elements 88 (see FIGS. 1I, 4), and also integrate function controls for computer input of data 168 (see FIG. 4), thus enabling capture and documentation using computer software programs 166 (see FIG. 4) and software interfaces. The measurement apparatus 10 (see FIGS. 1A-3F) essentially combines several devices into a single device, so that an operation that typically takes two operators or users may very easily be accomplished by a single operator or user.

The consistent application 148 (see FIG. 4) of pressure on the surface 84 (see FIG. 4) of the structure 86 (see FIG. 4), such as the aircraft part 86a (see FIG. 4) or aircraft assembly 86b (see FIG. 4) is controlled through the force applying elements 74 (see FIG. 4), such as the springs 74a (see FIG. 4), that maintain a set psi via the springs 74a (see FIG. 4) and the stop element 42 (see FIG. 4) or the domed surface elements 132 (see FIG. 4). The force applying elements 74 (see FIG. 4), such as the springs 74a (see FIG. 4), consistently control the psi (pounds per square inch) of pressure applied to the structure 86 (see FIG. 4), such as the aircraft part 86*a* (see FIG. 4).

The stop element 42 (see FIG. 4) and the domed surface elements 132 (see FIG. 4) also control the surface area angularity 152 (see FIG. 4) between the first contact ends 46*a* of the extending portions 47 (see FIG. 4) of the conductive measurement probes 44 (see FIG. 4) and the surface 84 (see FIG. 4), such as the flat surface 84*a* (see FIG. 4), the contoured surface 84*b* (see FIG. 4), or another suitable surface, and also control operator induced forced applications. By controlling the surface area angularity 152 (see FIG. 4) and the psi pressure, the operator or user may accurately measure the conductivity 138 (see FIG. 4) or the surface resistivity 136 (see FIG. 4) between the first contact ends 46*a* of the conductive measurement probes 44 (see FIG. 4), regardless of which operator or user is performing the testing, measuring, or work. Disclosed versions of the measurement apparatus 10 (see FIGS. 1A-3F) eliminate or reduce the variance or discrepancy of the conductivity measurements 140 (see FIG. 4) and the surface resistance measurements 137 (see FIG. 4) from operator to operator, that affect surface area contact, and disclosed versions of the measurement apparatus 10 (see FIGS. 1A-3F) provide improved conductivity measurement accuracy 142 (see FIG. 4).

In addition, disclosed versions of the measurement apparatus 10 (see FIGS. 1A-3F), the measurement system 150 (see FIG. 4), and the measurement method 170 (see FIG. 5) allow for improved visibility between the conductive measurement probes 44 (see FIGS. 1A, 2A, 3A, 4) and the surface 84 (see FIG. 4) of the structure 86 (see FIG. 4) being tested, measured, evaluated, and/or inspected, and allow for improved visibility to accurately position the direct current (DC) conductivity probes, such as the conductive measurement probes 44 (see FIGS. 1A, 2A, 3A, 4), before and during testing, measuring, evaluation, and inspection. The direct current (DC) testing, measuring, evaluation, and inspection of the structure 86 (see FIG. 4), such as the aircraft part 86*a* (see FIG. 4) or aircraft assembly 86*b* (see FIG. 4), is controlled through visual placement of the conductive measurement probes 44 on the surface 84 (see FIG. 4) of the structure 86. The visual and accurate placement of manually positioned conductive measurement probes 44 (see FIG. 4) on the surface 84 (see FIG. 4) of the structure 86 (see FIG. 4) increases the veracity of a pass/fail electrical direct current (DC) compliance and indicates a pass/fail electrical surface resistivity 136 (see FIG. 4) and conductivity 138 (see FIG. 4).

The illuminating aperture 87 (see FIG. 4) between the first contact ends 46*a* (see FIG. 4) of the conductive measurement probes 44 (see FIG. 4), such as positive and negative conductivity probes, provides an operator or user with enhanced visibility 156 (see FIG. 4) that is greatly improved under and between the first contact ends 46*a* (see FIG. 4) of the conductive measurement probes 44, thus allowing the operator or user to place the first contact ends 46*a* of the conductive measurement probes 44 accurately on the surface 84 (see FIG. 4) of the structure 86 (see FIG. 4), such as the aircraft part 86*a* (see FIG. 4) or aircraft assembly 86*b* (see FIG. 4).

This also frees the operator or user from having to use indirect lighting sources, such as a separate hand-held light, overhead lighting, floor or table mounted portable lighting systems, stanchion mounted systems, or other separate light sources. This frees the operator's or user's hands for measuring, testing, and inspecting with the measurement apparatus 10 (see FIG. 4). The light amplification 155 (see FIG. 4) provided by the light emitting elements 88 (see FIG. 4), such as the first LED 88*a* (see FIG. 4) and the second LED 88*b* (see FIG. 4), eliminates or greatly reduces any obstructed visibility or low visibility between the contact probe points, such as the first contact ends 46*a* (see FIG. 4) of the conductive measurement probes 44 (see FIG. 4), and allows the operator or user to place the conductive measurement probes 44, or probe contact points, accurately, even while travelling them across the surface 84 of the aircraft part 86*a* or aircraft assembly 86*b*.

The light amplification 155 (see FIG. 4) stimulated emission of radiation is positioned to illuminate aligned positioning, and surface area angularity 152 (see FIG. 4) of a direct current (DC) probe scan, allowing the operator directional visibility of the direct current (DC) inspection. By incorporating the light emitting elements 88 (see FIG. 4) between the conductive measurement probes 44 (see FIG. 4), or the two direct current (DC) probe contact points, it allows the operator or user to focus on placement and alignment without concern regarding adequate illumination or shadow distortions during probe inspection, testing, and measurement. The light emitting elements 88 (see FIG. 4) are located or positioned between the conductive measurement probes 44 (see FIG. 4), or two direct current (DC) probe contact points, and light up when a complete circuit is made. The measurement apparatus 10 (see FIG. 4) allows for hand-free operation once it is plugged into the circuit. Further, the measurement apparatus 10 (see FIG. 4) may be used in low light situations.

Moreover, disclosed versions of the measurement apparatus 10 (see FIGS. 1A-3F), the measurement system 150 (see FIG. 4), and the measurement method 170 (see FIG. 5) allow for wireless capability 101 (see FIG. 4), as well as a USB port 128 (see FIG. 4), to communicate resistance scan results to a computer 162 (see FIG. 4) for further data analysis 167 (see FIG. 4). The measurement apparatus 10 (see FIGS. 1A-3F) allows the operator or user the ability to be interactive with the operation being performed, such as measuring, inspecting, or performing a computing function 161 (see FIG. 4). The measurement apparatus 10 (see FIGS. 1A-3F) also allows the operator or user the ability to maneuver though a computer system 160 (see FIG. 4) and through computing functions 161 (see FIG. 4), while the measurement apparatus 10 (see FIGS. 1A-3F) is being used. By integrating the internal housing assembly 100 (see FIG. 2B), such as the wireless assembly 100*a* (see FIG. 2B), for example, the manually operated user select equipment, into the measurement apparatus 10 (see FIGS. 1A-3F), the operator or user may perform application functions and computing functions 161 (see FIG. 4), without having to remove the operator's or user's hands from the measurement apparatus 10 (see FIGS. 1A-3F). Thus, the measurement apparatus 10 (see FIGS. 1A-3F) solves the problem without the operator or user losing sight of the data 168 (see FIG. 4) obtained from the measuring, testing, and inspection, while the structure 86 is being measured, tested, and inspected. The measurement apparatus 10 (see FIGS. 1A-3F), the measurement system 150 (see FIG. 4), and the measurement method 170 (see FIG. 5) allow an operator or user the ability to perform a surface resistivity or conductivity scan and a computing function 161 (see FIG. 4) simultaneously.

Further, the measurement apparatus 10 (see FIGS. 1A-3F) may be used in applications where resistance lines are painted or embedded in the structure 86 (see FIG. 4) and there is a need to consistently measure the surface resistivity 136 (see FIG. 4) or conductivity 138 (see FIG. 4) from measurement to measurement. The surface resistance measurements 137 (see FIG. 4) and the conductivity measurements 140 (see FIG. 4) obtained are independent of the downward applied force 146 (see FIG. 4) or pressure applied by the operator or user when using the measurement apparatus 10. The measurement apparatus 10 (see FIGS. 1A-3F) may be used on a flat surface 84*a* (see FIG. 4), a contoured surface 84*b* (see FIG. 4), or another suitable surface. The first contact ends 46*a* (see FIG. 4) of the conductive measurement probes 44 (see FIG. 4) may be removable and may require shaping for use on contoured surfaces 84*b* or other non-flat surfaces. The measurement apparatus 10 (see FIGS. 1A-3F) may be used to test or check surface resistivity 136 (see FIG. 4) or conductivity 138 (see FIG. 4) for radomes 86*c* (see FIG. 4), around aircraft doors 206 (see FIG. 6) for lightning protection, for lightning decals applied to composite aircraft 200*a* (see FIG. 6), or for other suitable structures 86 (see FIG. 4).

In addition, disclosed versions of the measurement apparatus 10 (see FIGS. 1A-3F), the measurement system 150 (see FIG. 4), and the measurement method 170 (see FIG. 5) enable significant labor savings, as well an provide enhanced in-process controls, reduced process defects, improved product quality, and increased production rate of the structures 86 (see FIG. 4), such as the aircraft parts 86*a* (see FIG. 4) or aircraft assemblies 86*b* (see FIG. 4).

Further, disclosed versions of the measurement apparatus 10 (see FIGS. 1A-3F), the measurement system 150 (see FIG. 4), and the measurement method 170 (see FIG. 5) provide uniformity and consistency in conductivity measurements 140 (see FIG. 4) and surface resistance measurements 137 (see FIG. 4), as operators and users who measure with this measurement apparatus 10 (see FIGS. 1A-3F) preferably obtain the same or substantially the same values. Moreover, the integration of several devices embodied into one single device, enables a two operator or user operation to be accomplished by a single operator or user. Thus, a previously more complex, multi-part system that required multiple people to perform, has become a one person operation that is much simpler and easier to perform, and the results are more accurately and consistently collected with disclosed versions of the measurement apparatus 10 (see FIGS. 1A-3F), the measurement system 150 (see FIG. 4), and the measurement method 170 (see FIG. 5).

Many modifications and other versions or embodiments of the disclosure will come to mind to one skilled in the art to which this disclosure pertains having the benefit of the teachings presented in the foregoing descriptions and the associated drawings. The versions or embodiments described herein are meant to be illustrative and are not intended to be limiting or exhaustive. Although specific terms are employed herein, they are used in a generic and descriptive sense only and not for purposes of limitation.

What is claimed is:

1. A measurement apparatus for obtaining conductivity measurements of a surface of a structure, the measurement apparatus comprising:
a housing;
a pair of support legs depending from the housing, each support leg having a first end, wherein the first ends define a support leg plane,
a pair of conductive measurement probes slidably disposed between the support legs, wherein each of the support legs comprises a slide rail formed along an inner side of each support leg, each slide rail configured to slide along a corresponding slide groove formed in an outer side of each conductive measurement probe, such that the conductive measurement probes are slidably disposed between the support legs; and
at least one force applying member coupled to the housing, the at least one force applying member applying a biasing force to cause the pair of conductive measurement probes to extend a predetermined distance beyond the support leg plane,
wherein a downward applied force applied to the housing, when the conductive measurement probes are in contact with the surface, causes a displacement of the conductive measurement probes, until the first ends of the support legs contact the surface, and the displacement compresses the at least one force applying member by a displacement distance, to provide a predetermined probe contact force against the surface, the predetermined probe contact force being independent of the downward applied force, whereby conductivity measurements taken using the measurement apparatus are consistently obtained.

2. The measurement apparatus of claim 1, further comprising a center structural portion coupled between the conductive measurement probes, the center structural portion housing one or more light emitting elements in electrical connection with at least one of the conductive measurement probes, and the one or more light emitting elements being configured to illuminate the surface directly under the measurement apparatus, when a sufficient amount of the downward applied force is applied to the housing, to cause the displacement of the conductive measurement probes, until the first ends of the support legs contact the surface.

3. The measurement apparatus of claim 1, wherein the at least one force applying member comprises a spring.

4. The measurement apparatus of claim 1, further comprising a stop element coupled within each support leg, the stop element configured to limit the displacement of the slide rail of each support leg along the corresponding slide groove in each conductive measurement probe.

5. The measurement apparatus of claim 1, wherein the first ends of the support legs include three domed surface elements defining a domed surface plane, and further wherein the downward applied force applied to the housing, when the conductive measurement probes are in contact with the surface, causes the displacement of the conductive measurement probes, until the three domed surface elements defining the domed surface plane contact the surface.

6. The measurement apparatus of claim 1, wherein each of the conductive measurement probes extends the predetermined distance of at least 0.25 inches beyond the support leg plane, when the measurement apparatus is in a non-measurement position.

7. The measurement apparatus of claim 1, wherein the displacement of the conductive measurement probes, until the first ends of the support legs contact the surface, compresses the at least one force applying member by the displacement distance of at least 0.25 inches to provide the predetermined probe contact force against the surface of at least 0.5 pounds.

8. The measurement apparatus of claim 1, wherein the measurement apparatus is wireless and further comprises a wireless adapter element, a circuit board, an optical sensor, an optical sensor lens, an optical sensor protective lens, a power source, and one or more tactile switches.

9. The measurement apparatus of claim 1, further comprising a laser coupled to the center structural portion, the laser being configured to align the measurement apparatus with the surface of the structure to be measured, when the measurement apparatus scans the surface of the structure.

10. The measurement apparatus of claim 1, wherein the surface of the structure comprises one of, a flat surface, or a contoured surface.

11. A measurement system for obtaining conductivity measurements of a surface of a structure, the measurement system comprising:
a measurement apparatus comprising:
a housing;
a pair of support legs depending from the housing, each support leg having a first end, wherein the first ends define a support leg plane, and each support leg further having a slide rail formed along an inner side of each support leg;
a pair of conductive measurement probes slidably disposed between the support legs, each conductive measurement probe having a slide groove formed in an outer side of each conductive measurement probe, wherein each slide rail is configured to slide along each corresponding slide groove; and
at least one spring coupled to the housing, the at least one spring applying a biasing force to cause the pair of conductive measurement probes to extend a predetermined distance beyond the support leg plane; and
a computer system coupled to the measurement apparatus, the computer system comprising at least a computer, a processor device for executing one or more computing functions of the computer, and a computer software program configured to perform data analysis of data comprising the conductivity measurements obtained with the measurement apparatus,
wherein a downward applied force applied to the housing, when the conductive measurement probes are in contact with the surface, causes a displacement of the conductive measurement probes, until the first ends of the support legs contact the surface, and the displacement compresses the at least one spring by a displacement distance, to provide a predetermined probe contact force against the surface, the predetermined probe contact force being independent of the downward applied force, whereby conductivity measurements taken using the measurement apparatus are consistently obtained.

12. The measurement system of claim 11, wherein the measurement apparatus further comprises a center structural portion coupled between the conductive measurement probes, the center structural portion housing one or more light emitting elements in electrical connection with at least one of the conductive measurement probes, and the one or more light emitting elements being configured to illuminate the surface directly under the measurement apparatus, when a sufficient amount of the downward applied force is applied to the housing, to cause the displacement of the conductive measurement probes, until the first ends of the support legs contact the surface.

13. The measurement system of claim 11, wherein the measurement apparatus further comprises a stop element coupled within each support leg, the stop element configured to limit the displacement of the slide rail of each support leg along the corresponding slide groove in each conductive measurement probe.

14. The measurement system of claim 11, wherein the first ends of the support legs of the measurement apparatus include three domed surface elements defining a domed surface plane, and further wherein the downward applied force applied to the housing, when the conductive measurement probes are in contact with the surface, causes the displacement of the conductive measurement probes, until the three domed surface elements defining the domed surface plane contact the surface.

15. The measurement system of claim 11, wherein the computer system is wirelessly connected to the measurement apparatus and further comprises a wireless optical mouse, and wherein the measurement apparatus further comprises a wireless adapter element, a circuit board, an optical sensor, an optical sensor lens, an optical sensor protective lens, a power source, and one or more tactile switches.

16. A measurement method for obtaining conductivity measurements of a surface of a structure, the measurement method comprising the steps of:
assembling a measurement apparatus comprising:
a housing;
a pair of support legs depending from the housing, each support leg having a first end, wherein the first ends define a support leg plane;
a pair of conductive measurement probes slidably disposed between the support legs, wherein each of the support legs comprises a slide rail formed along an inner side of each support leg, each slide rail configured to slide along a corresponding slide groove formed in an outer side of each conductive measurement probe, such that the conductive measurement probes are slidably disposed between the support legs; and
at least one force applying member coupled to the housing, the at least one force applying member applying a biasing force to cause the pair of conductive measurement probes to extend a predetermined distance beyond the support leg plane;
positioning the measurement apparatus on the surface of the structure to be measured for conductivity, so that a first contact end of each of the conductive measurement probes is in contact with the surface;
applying a downward applied force to a top end of the housing, causing a displacement of the conductive measurement probes, until the first ends of the support legs contact the surface;
compressing, via the displacement, the at least one force applying member by a displacement distance, to provide a predetermined probe contact force against the surface, the predetermined probe contact force being independent of the downward applied force; and
moving the measurement apparatus across the surface, and obtaining conductivity measurements with the measurement apparatus that are consistent.

17. The measurement method of claim 16 wherein assembling the measurement apparatus further comprises assembling the measurement apparatus comprising a center structural portion coupled between the conductive measurement probes, the center structural portion housing one or more light emitting elements in electrical connection with at least one of the conductive measurement probes, and the one or more light emitting elements illuminating the surface directly under the measurement apparatus, when a sufficient amount of the downward applied force is applied to the housing, to cause the displacement of the conductive measurement probes, until the first ends of the support legs contact the surface.

18. The measurement method of claim 16 wherein assembling the measurement apparatus further comprises assembling the measurement apparatus comprising a stop element coupled within each support leg, the stop element limiting the displacement of a slide rail of each support leg along a corresponding slide groove in each conductive measurement probe.

19. The measurement method of claim 16 wherein assembling the measurement apparatus further comprises assembling the measurement apparatus wherein the first ends of the support legs include three domed surface elements defining a domed surface plane, and further wherein applying the downward applied force to the top end of the housing, causes the displacement of the conductive measurement probes, until the three domed surface elements defining the domed surface plane contact the surface.

20. The measurement method of claim 16 wherein assembling the measurement apparatus further comprises assembling the measurement apparatus to be wireless and comprising a wireless adapter element, a circuit board, an optical sensor, an optical sensor lens, an optical sensor protective lens, a power source, and one or more tactile switches, and further wherein the measurement method comprises wirelessly connecting the measurement apparatus to a computer system.

\* \* \* \* \*